(12) United States Patent
Chandrasekhar et al.

(10) Patent No.: US 9,225,720 B1
(45) Date of Patent: Dec. 29, 2015

(54) SECURITY SYSTEM FOR DATA STORED IN THE CLOUD

(71) Applicant: Trend Micro Incorporated, Tokyo (JP)

(72) Inventors: Bharath Kumar Chandrasekhar, Sunnyvale, CA (US); Jeremy Hubble, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 13 days.

(21) Appl. No.: 14/104,737

(22) Filed: Dec. 12, 2013

(51) Int. Cl.
*G06F 15/16* (2006.01)
*H04L 29/06* (2006.01)
*H04L 29/08* (2006.01)

(52) U.S. Cl.
CPC ............... *H04L 63/10* (2013.01); *H04L 63/20* (2013.01); *H04L 67/10* (2013.01); *H04L 69/329* (2013.01)

(58) Field of Classification Search
CPC ......... H04L 67/10; H04L 63/20; H04L 63/10; H04L 69/329
USPC ......... 709/203, 217, 218, 219, 223, 224, 225; 726/1, 3
See application file for complete search history.

(56) References Cited

U.S. PATENT DOCUMENTS

| | | | |
|---|---|---|---|
| 5,991,399 A | 11/1999 | Graunke et al. | |
| 6,356,915 B1 | 3/2002 | Chtchetkine et al. | |
| 6,886,096 B2 | 4/2005 | Appenzeller et al. | |
| 7,003,117 B2 | 2/2006 | Kacker et al. | |
| 7,017,181 B2 | 3/2006 | Spies et al. | |
| 7,103,911 B2 | 9/2006 | Spies et al. | |
| 7,113,594 B2 | 9/2006 | Boneh et al. | |
| 7,266,847 B2 | 9/2007 | Pauker et al. | |
| 2004/0179684 A1 | 9/2004 | Appenzeller et al. | |
| 2006/0080702 A1 | 4/2006 | Diez et al. | |
| 2007/0288915 A1* | 12/2007 | Zotter et al. | 717/170 |
| 2008/0134316 A1 | 6/2008 | Devonshire et al. | |
| 2009/0328164 A1 | 12/2009 | Sunder et al. | |
| 2010/0169948 A1 | 7/2010 | Budko et al. | |
| 2011/0173438 A1 | 7/2011 | Matzkel | |

FOREIGN PATENT DOCUMENTS

| | | |
|---|---|---|
| GB | 2 434 947 | 8/2007 |
| GB | 2 436 668 | 10/2007 |
| GB | 2 436 910 | 10/2007 |

(Continued)

OTHER PUBLICATIONS

IT Security Journal—Information Technology Security >> Ciphercloud interview, 2 sheets [retrieved on Oct. 5, 2013], retrieved from the internet: http://itsecurityjournal.com/tag/ciphercloud-interview/.

(Continued)

*Primary Examiner* — Alexander Lagor
(74) *Attorney, Agent, or Firm* — Okamoto & Benedicto LLP

(57) ABSTRACT

A cloud access security system provides security to data stored in the cloud. The cloud access security system maintains version service information that indicates servers that service web services calls to particular versions of a cloud application service. Upon detection of a web service call to an unknown version of the cloud application service, the cloud access security system redirects the web service call to a known good server that services web service calls that are made to a previous version of the cloud application service. The cloud access security system may employ an encryption scheme that allows for partial decryption.

9 Claims, 19 Drawing Sheets

(56) References Cited

FOREIGN PATENT DOCUMENTS

| WO | 2007088337 | 8/2007 |
|----|------------|--------|
| WO | 2007110598 | 10/2007 |

OTHER PUBLICATIONS

Vaultive—Exhange / Office 365 Encryption—Ownership & Control of Data in the Cloud, 2 sheets [retrieved on Oct. 5, 2013], retrieved from the internet: http://www.vaultive.com/.

CipherCloud Offers Military-Grade Encryption / Cloud Computing Journal, 2 sheets [retrieve on Oct. 5, 2013], retrieved from the internet: http://cloudcomputing.sys-con.com/node/2453422.

Amazon Web Services Developer Community: S3 Encryption, posted on Jun. 10, 2009 (1 sheet).

Amazon Web Services: Introducing Amazon Virtual Private Cloud, 1 sheet [retrieved on Aug. 27, 2009], retrieved from the internet: http://aws.amazon.com/.

Extern blog SensePost;—Blackhat presentation demo vids: Summary, Aug. 2009, 2 sheets.

Rational Survivability: The Big Four Cloud Computing Providers: Security Compared (Part I), Nov. 26, 2008, 3 sheets.

Cloud Computing, Cloud Hosting & Online Storage by Rackspace Hosting, 4 sheets [retrieved on Aug. 27, 2009], retrieved from the internet: http://www.rackspacecloud.com/.

Saied Hosseini Khayat, "Using Communication Encryption to Share a Secret" Aug. 18, 2008, pp. 1-6, Electrical Engineering Dept., Ferdowsi University of Mashhad, Iran.

\* cited by examiner

FIG. 16
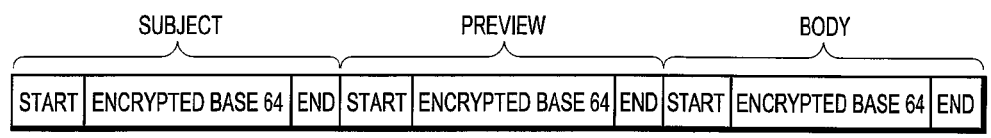
FIG. 17
FIG. 18

SECURITY SYSTEM FOR DATA STORED IN THE CLOUD

CROSS-REFERENCE TO RELATED APPLICATION

This application is related to U.S. application Ser. No. 14/053,402, filed on Oct. 14, 2013.

BACKGROUND OF THE INVENTION

1. Field of the Invention

The present invention relates generally to computer security, and more particularly but not exclusively to systems and methods for securing data stored in the cloud.

2. Description of the Background Art

Cloud-based emails are examples of data that are stored in the cloud instead of locally in a user computer or server of a private (e.g., enterprise) computer network. Generally speaking, cloud-based email systems allow email users to send and receive emails without having to host and maintain their own email server. Examples of cloud-based email systems include the Microsoft Office 365™ email server and the Google Mail™ email server. A cloud-based email system is in the cloud in that it is employed over a computer network, such as the Internet. More particularly, a user may communicate with the cloud-based email system to send and receive emails over the Internet.

Although cloud-based email systems provide numerous advantages over on-premise, self-maintained email servers, cloud-based email systems are provided by a third-party and thus raise security and privacy concerns. In particular, potential users are concerned that emails stored in a cloud-based email system are accessible to the cloud-based email system provider and may be readily provided to other parties, such as in response to a subpoena, for example.

SUMMARY

In one embodiment, a cloud access security system provides security to data stored in the cloud. The cloud access security system maintains version service information that indicates servers that service web services calls to particular versions of a cloud application service. Upon detection of a web service call to an unknown version of the cloud application service, the cloud access security system redirects the web service call to a known good server that services web service calls that are made to a previous version of the cloud application service. The cloud access security system may employ an encryption scheme that allows for partial decryption.

These and other features of the present invention will be readily apparent to persons of ordinary skill in the art upon reading the entirety of this disclosure, which includes the accompanying drawings and claims.

DESCRIPTION OF THE DRAWINGS

FIG. 16 shows a schematic diagram of data encrypted by a cloud access security system in accordance with an embodiment of the present invention.

FIG. 17 shows example encrypted data in the JSON (JavaScript object notation) format and the HTML (hypertext markup language) format in accordance with an embodiment of the present invention.

FIG. 18 shows a series of encrypted data for the subject field, preview portion, and message body of an email in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
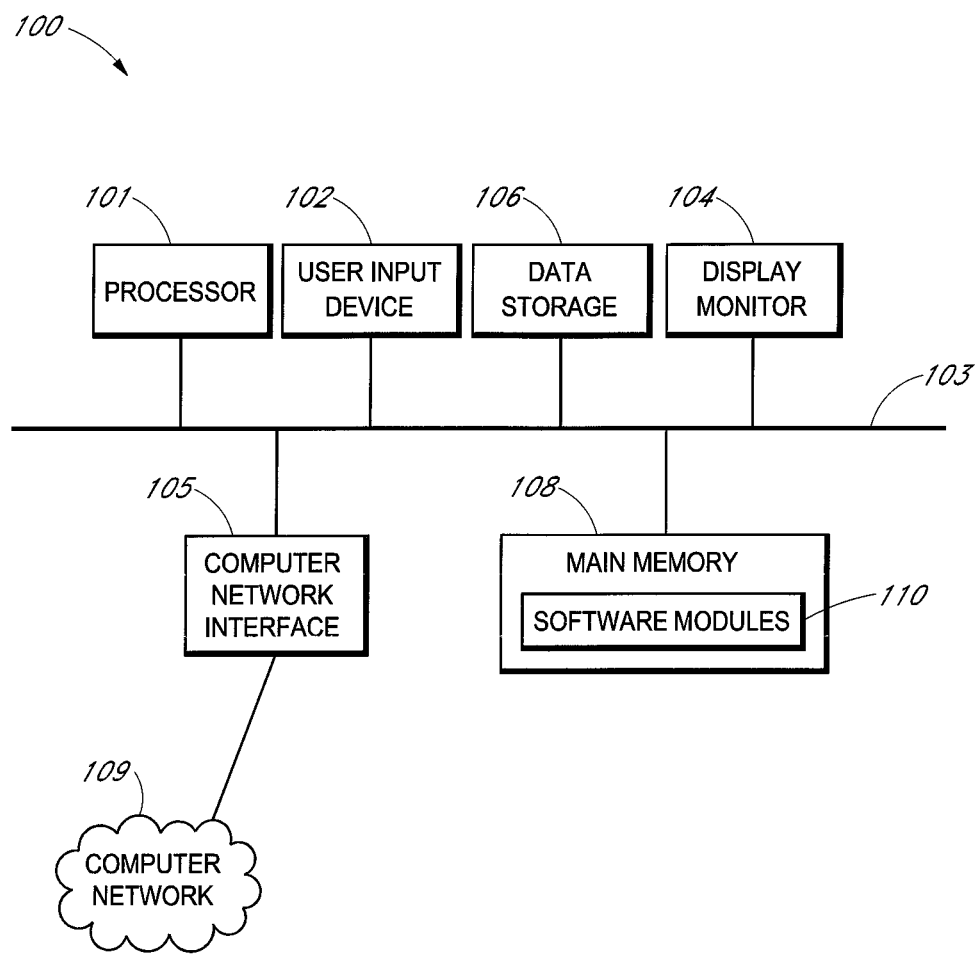
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as a client computer or one of the computers of a cloud access security system, for example. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106

(e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise protocol proxies, a data indexer, a cryptography component, and an encryptor when the computer 100 is employed as part of a cloud access security system.

The computer 100 may be configured to perform its functions by executing the software modules 110. The software modules 110 may be loaded from the data storage device 106 to the main memory 108. An article of manufacture may be embodied as computer-readable storage medium including instructions that when executed by a computer causes the computer to be operable to perform the functions of the software modules 110.

Figure 2:
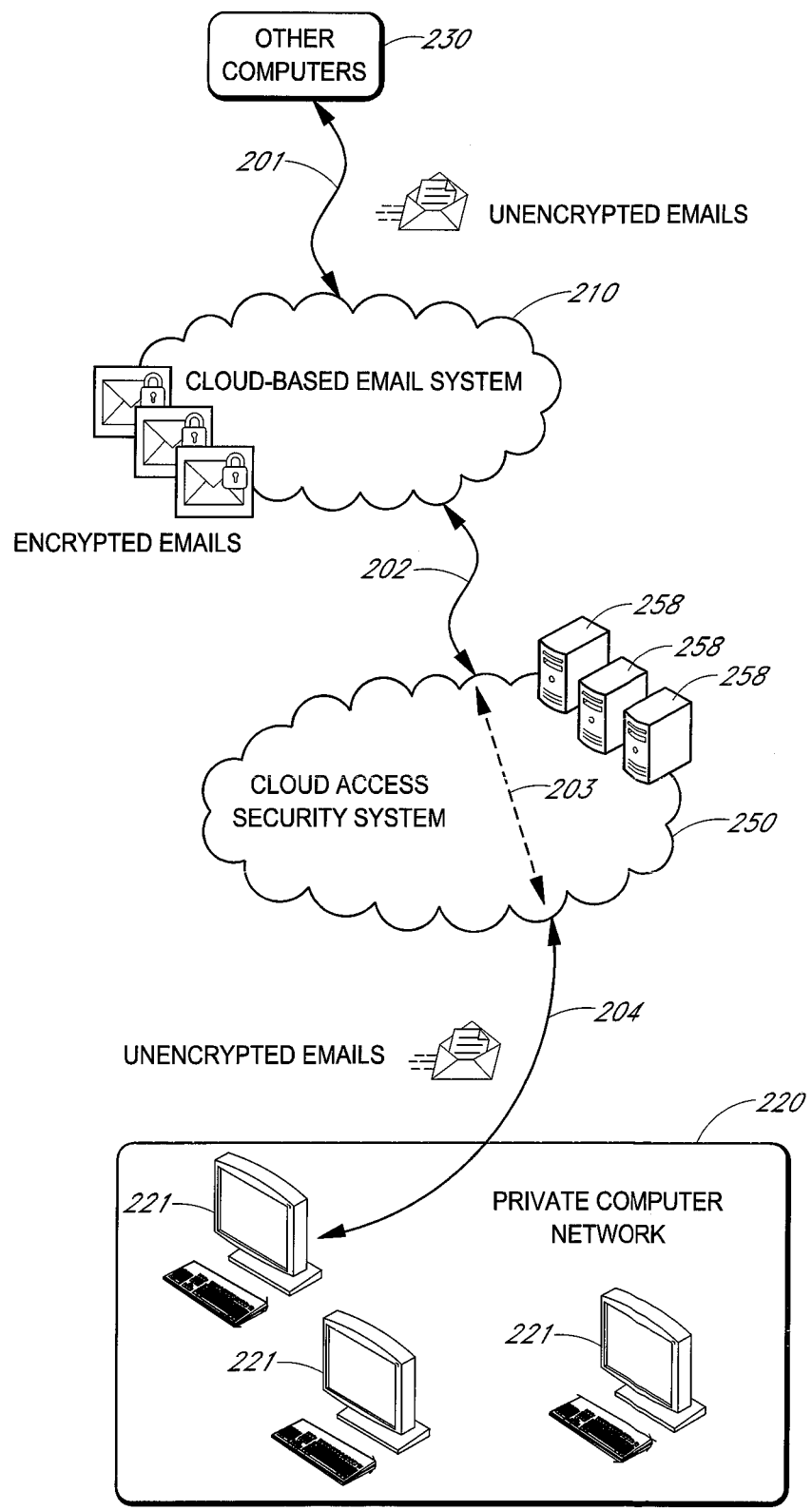
FIG. 2 shows a schematic diagram of a system for securing cloud-based emails in accordance with an embodiment of the present invention.

FIG. 2 shows a schematic diagram of a system for securing cloud-based emails in accordance with an embodiment of the present invention. In the example of FIG. 2, the system comprises a cloud-based email system 210, one or more client computers 221, and a cloud access security system 250. The cloud-based email system 210 may comprise a commercially available cloud-based email system, such as the Microsoft Office 365™ email server and the Google Mail™ email server, for example. Users of the private computer network 220 may maintain email accounts, which are commonly referred to as "mailboxes," in the cloud-based email system 210. Emails stored in the cloud-based email system 210 for users of the private computer network 220 may be encrypted by the cloud access security system 250 in a seamless and transparent manner to preserve the original user-experience provided by cloud-based email system 210. The cloud-based email system 210 may communicate with other computers 230 (see arrow 201) to receive incoming emails for a user and to forward outgoing emails sent by the user.

A client computer 221 may comprise a computer employed by a user to access the cloud-based email system 210. The client computer 221 may comprise a desktop computer, a laptop computer, a smartphone, or a mobile computing device (e.g., a tablet), for example. In the example of FIG. 2, the client computers 221 are part of a private computer network 220, such as a computer network maintained and operated by an enterprise. In the example of FIG. 2, the private computer network 220 does not have an on-premises email server. Instead, the private computer network 220 provides email services using the cloud-based email system 210, which is owned and operated by a third-party, i.e., not associated with the private computer network 220. In other embodiments, the client computers 221 are part of a public computer network.

The cloud access security system 250 may comprise one or more computers 258 that secure emails stored in the cloud-based email system 210. In one embodiment, the cloud access security system 250 indexes unencrypted emails in an index, replaces unencrypted emails stored in the cloud-based email system 210 with encrypted emails, and provides the client computers 221 an interface for accessing the cloud-based email system 210. In one embodiment, the cloud access security system 250 receives all email communications between the cloud-based email system 210 and the client computers 221 (see arrow 203). The cloud access security system 250, the cloud-based email system 210, and the client computers 221 may communicate over the Internet.

In the example of FIG. 2, the cloud access security system 250 forwards and receives emails to and from client computers 221 of the private computer network 220 (see arrow 204). In one embodiment, the emails transferred between the client computers 221 and the cloud access security system 250 and emails transferred between the cloud-based email system 210 and other computers 230 are unencrypted. However, as will be more apparent below, the cloud access security system 250 simply provides another layer of encryption that is transparent to the cloud-based email system 210, the client computers 221, and the other computers 230 when the emails are encrypted by some other system. In this disclosure, an "email" has not been encrypted by the cloud access security system 250 unless specifically noted or referred to as an "encrypted email" (e.g., "encrypted outgoing email", "encrypted incoming email").

The cloud access security system 250 may detect reception of an incoming email in the cloud-based email system 210, with the incoming email being sent by another computer 230 (e.g., an email server computer) to a user of a client computer 221. The cloud access security system 250 may retrieve the incoming email from the cloud-based email system 210 (e.g., a copy in the inbox of the user's mailbox), encrypt the incoming email to generate an encrypted incoming email, and replace the incoming email with its corresponding encrypted incoming email in the cloud-based email system 210. When the client computer 221 requests to receive the incoming email, the cloud access security system 250 may retrieve the corresponding encrypted incoming email from the cloud-based email system 210, decrypt the encrypted incoming email back to the incoming email, and provide the incoming email to the client computer 221.

The cloud access security system 250 may receive a search request for particular emails from the client computer 221, identify encrypted emails stored in the cloud-based email system 210 and responsive to the search request, retrieve the identified encrypted emails from the cloud-based email system 210, decrypt the identified encrypted emails to decrypted emails, and provide the decrypted emails to the client computer 221 as search results responsive to the search request.

The cloud access security system 250 may receive an outgoing email to be sent by the client computer 221 to the other computer 230, forward the outgoing email to the cloud-based email system 210 for forwarding to the other computer 230, retrieve the outgoing email stored in the cloud-based email system 210 (e.g., a copy in the sent folder of the user's mailbox), encrypt the outgoing email to generate a corresponding encrypted outgoing email, and replace the outgoing email stored in the cloud-based email system 210 with its corresponding encrypted outgoing email.

In the example of FIG. 2, the cloud access security system 250 communicates with the cloud-based email system 210 (see arrow 202) to forward and receive emails, to receive email event notifications, and to replace unencrypted emails stored in the cloud-based email system 210 with encrypted emails.

Figure 3:
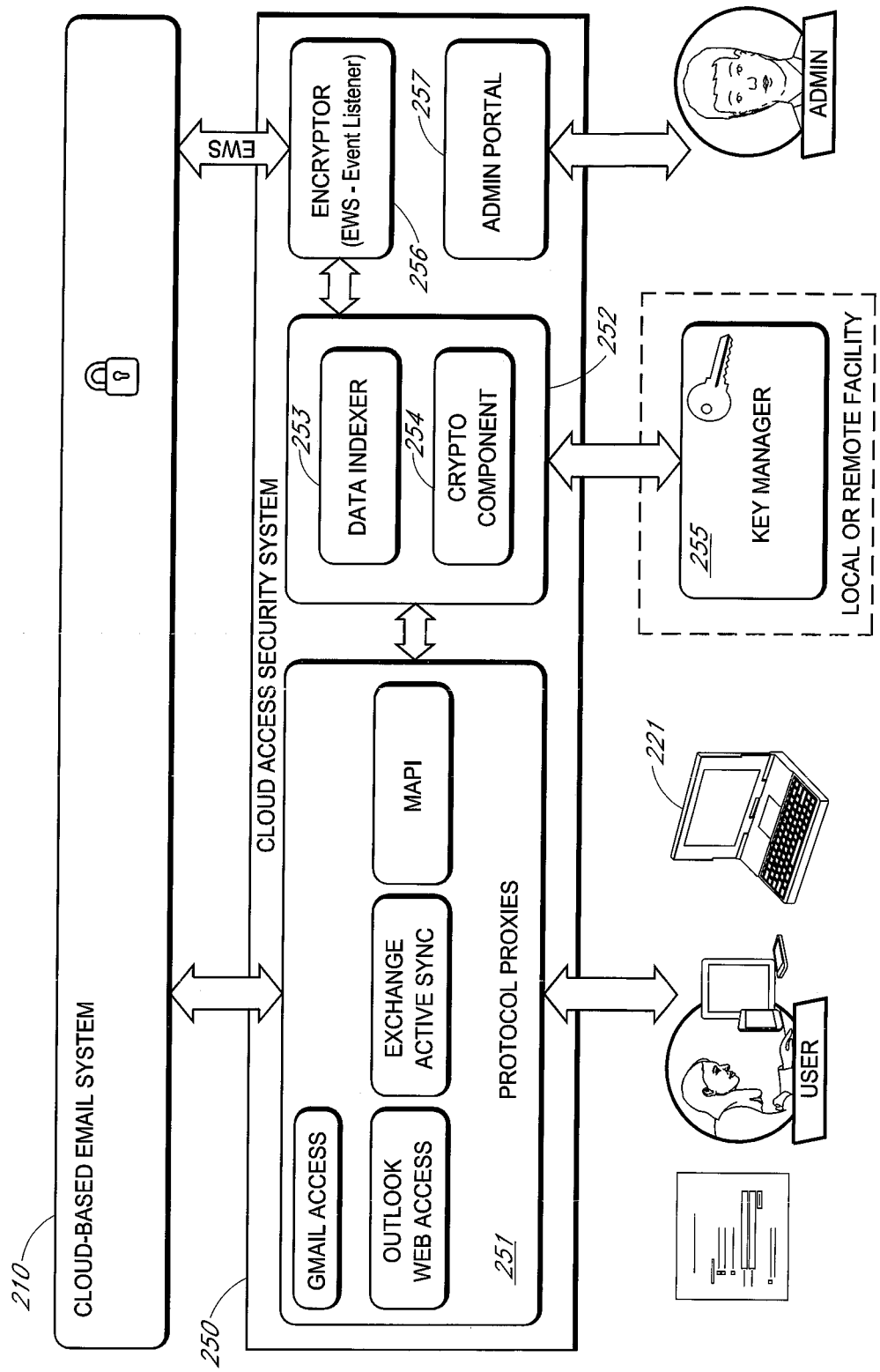
FIG. 3 shows a schematic diagram of a cloud access security system in accordance with an embodiment of the present invention.

FIG. 3 shows a schematic diagram of a cloud access security system in accordance with an embodiment. In the example of FIG. 3, the cloud access security system 250 comprises one or more protocol proxies 251, an encryption module 252, an event listener 256, and an administration portal 257. The components of the cloud access security system 250 may be implemented in software as computer-readable program code, in hardware as programmed logic and other electrical circuits, or in a combination of both hardware and software. In one embodiment, the aforementioned components of the cloud access security system 250 are implemented in software running on one or more computers.

In one embodiment, a protocol proxy 251 comprises computer-readable program code for monitoring and processing email communications between a client computer 221 and the cloud-based email system 210. In one embodiment, all email communications between a client computer 221 and the cloud-based email system 210 pass through, and are thereby received by, a protocol proxy 251. The particular protocol proxy 251 that receives and processes email communications depend on the email communication protocol of the cloud-based email system 210 and the client computer 221. For example, a protocol proxy 251 may comprise a proxy for the Microsoft Outlook Web Access™ protocol, the Microsoft Exchange ActiveSync™ protocol, the Messaging Application Programming Interface (MAPI) protocol, the Microsoft Exchange Web Services™ (EWS) protocol, a protocol for accessing the Google Gmail™ email server, etc. As a particular example, a protocol proxy 251 may comprise a proxy for the Microsoft Exchange ActiveSync™ protocol when the cloud-based email system 210 and the client computer 221 communicates in accordance with the Microsoft Exchange ActiveSync™ protocol.

In one embodiment, a protocol proxy 251 processes email communications between the cloud-based email system 210 and the client computer 221 to provide a seamless and transparent encryption service for emails stored in the cloud-based email system 210. A protocol proxy 251 receives email communications between the cloud-based email system 210 and the client computer 221 and interprets the email communications in accordance with the email communication protocol employed. The protocol proxy 251 may process the email communications to pass through outgoing emails (i.e., emails sent by a user of the client computer 221) to the cloud-based email system 210 for forwarding to recipients and to allow for decryption of encrypted emails stored in the cloud-based email system 210 and being accessed by the client computer 221, such as encrypted incoming emails (i.e., emails addressed to the user of the client computer 221) and stored emails (e.g., emails in sent folder, inbox, etc.) being searched by the user of the client computer 221.

In one embodiment, the encryption module 252 comprises a data indexer 253 and a cryptography component 254. The data indexer 253 may comprise computer-readable program code for indexing emails. The data indexer 253 may create an index for individual mailboxes in the cloud-based email system 210, with the index comprising the searchable components of emails and identification of encrypted versions of the emails. The index may be consulted to identify encrypted emails that meet particular search criteria.

The data indexer 253 may index an email for identification, searching, and location. In one embodiment, the data indexer 253 receives an email and indexes the email by storing the contents of the email that are typically searched by a user, such as message body, recipients, sender, attachments, etc. The data indexer 253 indexes emails in their unencrypted state, i.e., emails that have not been encrypted by the cryptography component 254. The data indexer 253 stores the searchable contents of the email in a compact format for relatively fast searching and low storage consumption, such as by removing non-essential data of the email, e.g., spaces, articles, commonly used English (or other language) words, etc. After the email has been encrypted by the cryptography component 254, the data indexer 253 also indexes the email by keeping track of the corresponding encrypted version of the email, such as by mapping the encrypted and unencrypted versions of the email by their common message identifier (ID). This allows for email search by consulting the index to identify the emails that meet search criteria, and then identifying the corresponding encrypted emails stored in the cloud-based email system 210 for retrieval. As can be appreciated, because emails stored in the cloud-based email system 210 have been encrypted by the cryptography component 254, emails in the cloud-based email system 210 cannot be readily searched. The data indexer 253 thus advantageously allows for searching of encrypted emails stored in the cloud-based email system 210. The data indexer 253 may be implemented using the open source Solr indexer, for example.

In one embodiment, the cryptography component 254 comprises computer-readable program code for encrypting emails and decrypting encrypted emails. The cryptography component 254 (or another component of the encryption module 252) may mark emails it encrypted to identify them as having been encrypted by the encryption module 252. In one embodiment, the cryptography component 254 only encrypts the user portions of the email, such as the message body and attachments, and other portions of the email that does not adversely affect format compatibility with the cloud-based email system. More specifically, the cryptography component 254 may preserve the formatting of the email to maintain compatibility with the cloud-based email system 210. For example, when the cloud-based email system 210 comprises the Microsoft Office 365™ email server, the cryptography component 254 may encrypt the email's text message body, subject field, and attachment, without encrypting the headers (e.g., recipient and sender information) and item formatting. The email subject field and message body may be encrypted using separate techniques to support "group by subject" functionality of some cloud-based email systems. The cryptography component 254 may encrypt an email into an encrypted email, and decrypt the encrypted email back to the unencrypted email. The cryptography component 254 may use different cryptography seeds for different emails of the same user for improved security, such as to prevent frequency analysis attacks. In one embodiment, the cryptography component 254 employs the AES-256 (Advanced Encryption Standard) encryption algorithm to encrypt emails and decrypt encrypted emails. Other encryption algorithms may also be employed without detracting from the merits of the present invention.

In one embodiment, encryption keys for encrypting emails and decrypting encrypted emails are received by the cryptography component 254 from a key manager 255. The key manager 255 may comprise a key server running on one or more computers. In one embodiment, the key manager 255 is part of the cloud access security system 250. In other embodiments, for more control of access to the emails, the key manager 255 may be hosted on-premise, i.e., within the private computer network 220 (see FIG. 2) that includes the client computer 221.

In one embodiment, the event listener 256 comprises computer-readable program code for communicating with the cloud-based email system 210. In one embodiment, the event listener 256 receives email event notifications from the cloud-based email system 210 and issues email processing requests to the cloud-based email system 210. The event listener 256 may register with the cloud-based email system 210 to receive email event notifications for particular mailboxes, such as notifications when a mailbox receives an incoming email and sends an outgoing email. The event listener 256 may communicate with the cloud-based email system 210 using a protocol recognized by the cloud-based email system 210. For example, the event listener 256 may communicate with the cloud-based email system 210 in accordance with the Microsoft Exchange Web Services™ protocol when the cloud-based email system 210 comprises the Microsoft Office 365™ email server.

In one embodiment, the administration portal 257 comprises computer-readable program code for allowing an administrator, such as Information Technology (IT) personnel, to configure the cloud access security system 210. For example, the administrator may log onto the cloud access security system 210 by way of the portal 257 to enter particulars for mailboxes that will be provided encryption service. As a particular example, when the cloud-based email system 210 comprises the Microsoft Office 365™ email server, a user's mailbox will have a corresponding service account information that identifies the mailbox and provides access privileges (e.g., replacement of emails in the mailbox) to the mailbox. An administrator may log onto the administration portal 257 to provide service account information for a user's mailbox to the event listener 256, which uses the service account information to register with the cloud-based email system 210 to receive email event notifications to gain access privileges to the mailbox.

FIGS. 4-9 show flow diagrams that schematically illustrate example operations of a cloud access security system in accordance with an embodiment of the present invention. In the example of FIGS. 4-9, the cloud-based email system 210 comprises the Microsoft Office 365™ email server, the protocol proxy 251 comprises a proxy for the Microsoft Exchange Active Sync™ protocol, and the event listener 256 communicates with the cloud-based email system 210 in accordance with the Microsoft Exchange Web Services™ protocol. As can be appreciated other cloud-based email systems and corresponding protocols may also be employed without detracting from the merits of the present invention. Furthermore, the example operations depict a single mailbox for a user of a client computer 221. As can be appreciated, embodiments of the present invention are typically employed to service a plurality of users, with each user having his or her own mailbox. The client computer 221 is configured to connect to the cloud access security system 250, instead of directly to the cloud-based email system 210, when accessing the cloud-based email system 210. For example, the configuration of the client computer 221 may be modified so that it points to the cloud access security system 250, instead of to the cloud-based email system 210, when accessing the cloud-based email system 210. As a particular example, assuming the user has been given the address of "abc-org.onmicrosoft.com" to access his mailbox in the cloud-based email system 210, the client computer 221 may instead be pointed to the address "abc-org.trendmicro.com", which is the address of the cloud access security system 250 for the user. As another example, the user may register a custom email domain and point the domain name service (DNS) A record, i.e., host record, of that custom domain to the user's cloud access security system 250 address. In that example, the client computer 221 is configured to point to the custom domain name to access the cloud-based email system 210.

Figure 4:
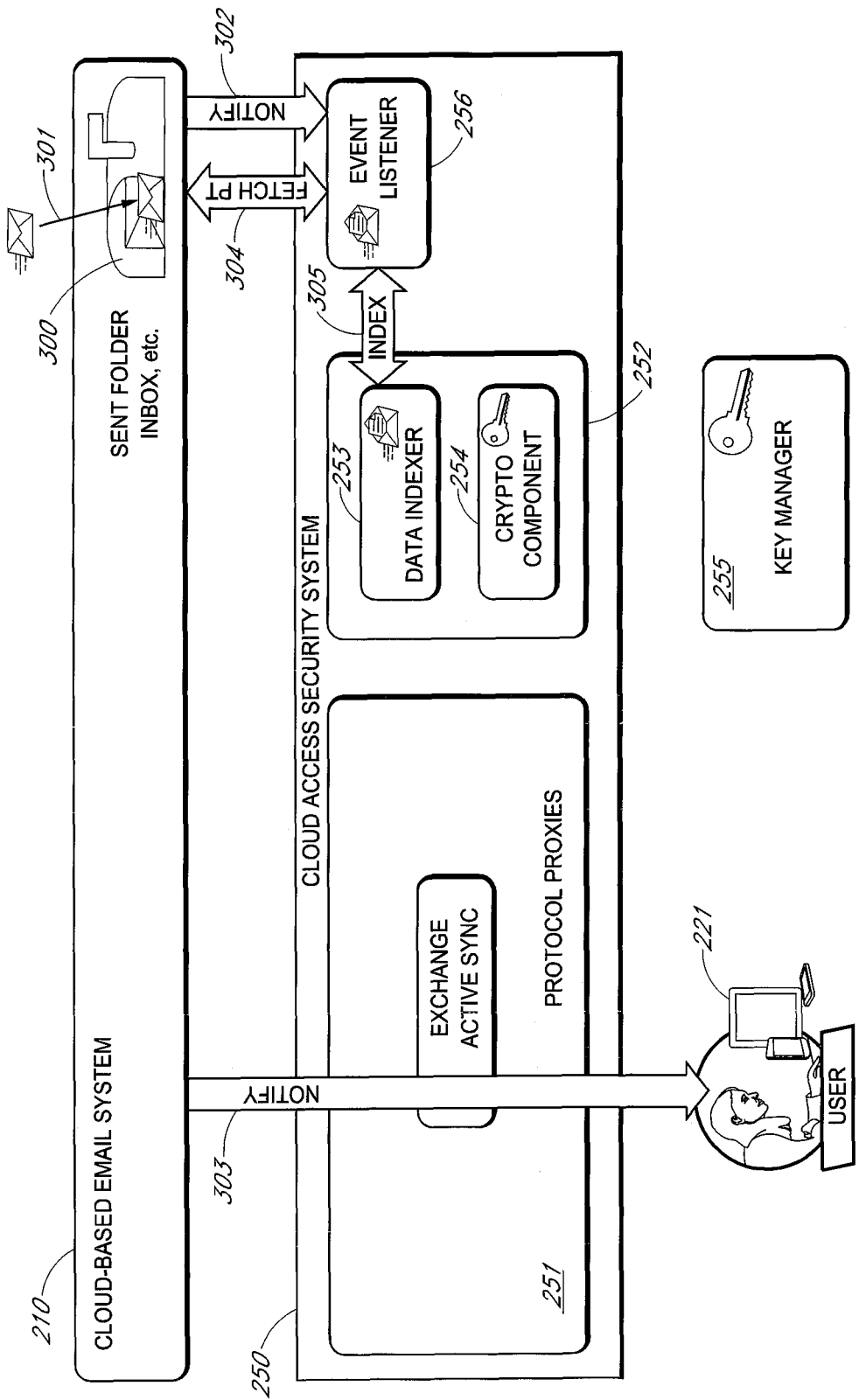
FIGS. 4-9 show flow diagrams that schematically illustrate example operations of a cloud access security system in accordance with an embodiment of the present invention.
Figure 5:
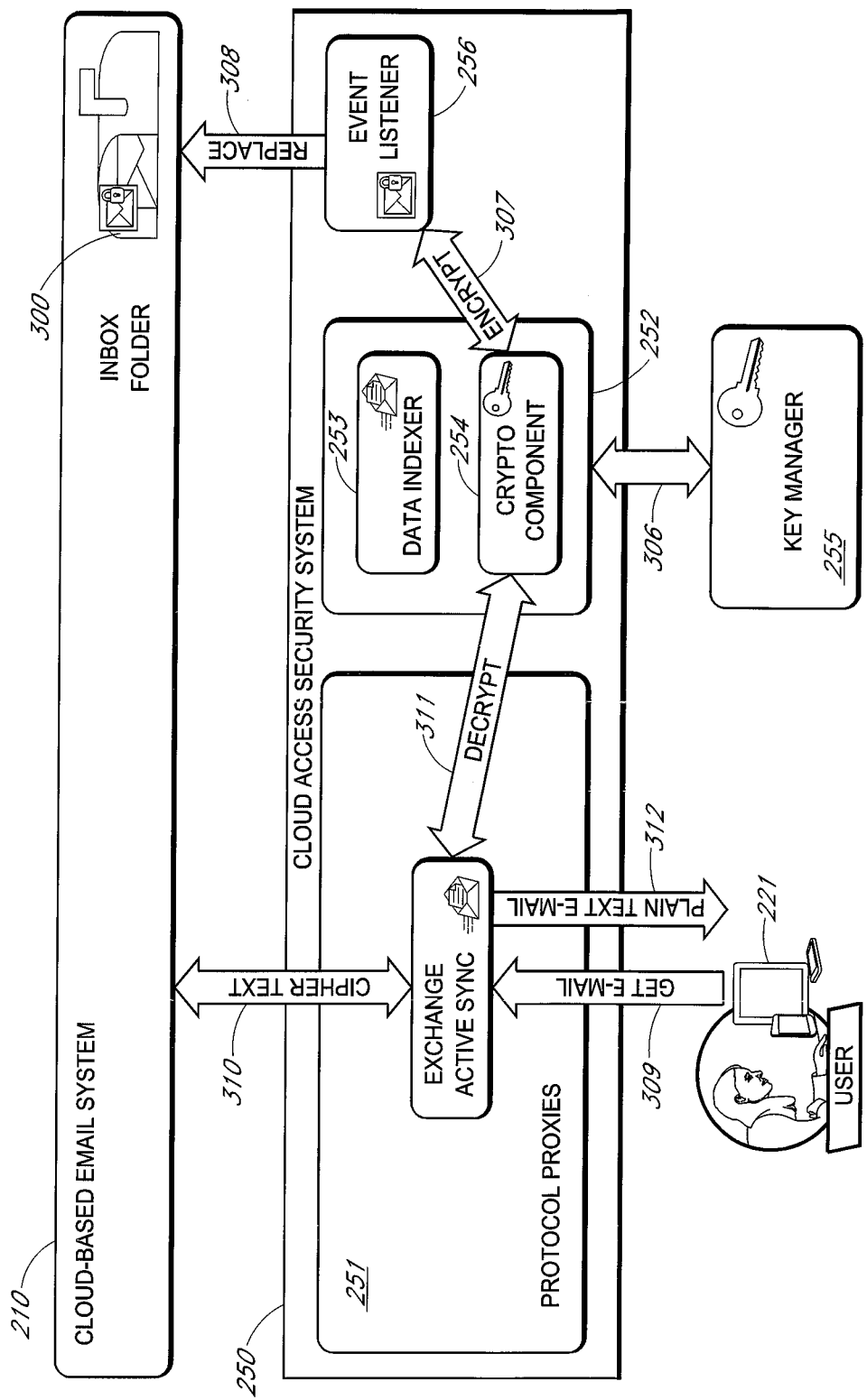

Referring first to FIGS. 4 and 5, there is shown a flow diagram that schematically illustrates processing of an incoming email for a mailbox in accordance with an embodiment of the present invention. In the example of FIGS. 4 and 5, the incoming email is received in the cloud-based email system 210 (see FIG. 4, arrow 301), with the incoming email being addressed to a user having a corresponding mailbox 300 in the cloud-based email system 210. Accordingly, the incoming email is received in the mailbox 300 of the user. The incoming email may be found in the inbox of the mailbox 300, for example.

In the following examples, the event listener 256 has registered with the cloud-based email system 210 to receive notifications whenever a new incoming email is received in the mailbox 300. Accordingly, as shown in FIG. 4, the cloud-based email system 210 notifies the event listener 256 when the incoming email is first received in the mailbox 300 (see arrow 302). The cloud-based email system 210 may also send a separate notification to the client computer 221 of the user (see arrow 303), informing the user that there is a new incoming email in his mailbox 300. The notification for the user is received by the protocol proxy 251, which forwards the notification to the client computer 221 of the user.

In response to receiving the notification that a new incoming email has been received in the mailbox 300, the event listener 256 retrieves the incoming email from the cloud-based email system 210 (see arrow 304). For example, the event listener 256 may request the cloud-based email system 210 to receive a copy of the incoming email (or individual contents of the incoming email, such as message body, subject, etc.) from the inbox of the mailbox 300. The event listener 256 receives the incoming email from the cloud-based email system 210 and forwards the incoming email to the encryption module 252. There, the data indexer 253 receives and indexes the incoming email (see arrow 304) in its unencrypted state, i.e., not encrypted by the cryptography component 254. The data indexer 253 indexes the incoming email in its unencrypted, typically clear text state to allow for subsequent searching.

Continuing in FIG. 5, the encryption module 252 requests and receives an encryption key from the key manager 255 (see arrow 306). The event listener 256 receives the incoming email from the event listener 256, encrypts the incoming email using the encryption key received from the key manager 255, and provides the resulting encrypted incoming email to the event listener 256 (see arrow 307). Upon receiving the encrypted incoming email, the event listener 256 replaces a copy of the incoming email stored in the mailbox 300 (e.g., in the inbox of the user) with the encrypted incoming email (see arrow 308). For example, the event listener 256 may delete the incoming email stored in the mailbox 300 and replace that deleted incoming email with the corresponding encrypted incoming email. As can be appreciated, the deletion and replacement of the incoming email may be performed in the same step. Accordingly, the mailbox 300 now only has an encrypted version of the incoming email. This advantageously protects against unauthorized viewing of the incoming email as stored in the cloud-based email system 210.

In response to receiving the notification of arrival of the incoming email, the user of the client computer 221 may decide to retrieve the incoming email. For example, the client computer 221 may request the cloud-based email system 210 to provide the incoming email to the client computer 221 (see arrow 309). The protocol proxy 251 receives the request for the incoming email, identifies the request as a request for the incoming email, and forwards the request to the cloud-based email system 210 (see arrow 310). In response to receiving the request, the cloud-based email system 210 retrieves the now encrypted incoming email, and forwards the encrypted incoming email to the client computer 221 (see arrow 310). The protocol proxy 251 receives the encrypted incoming email, detects that the encrypted incoming email is in a format encrypted by the encryption module 252 (e.g., by checking for a mark placed by the encryption module 252 on emails it encrypted), and accordingly proceeds to facilitate decryption of the encrypted incoming email (see arrow 311). For example, in response to detecting that the incoming email is in a format encrypted by the encryption module 252, the protocol proxy 251 may forward the encrypted incoming email to the cryptography component 254. The cryptography component 254 decrypts the encrypted incoming email back to the incoming email using an associated encryption key received from the key manager 255. The cryptography component 254 returns the incoming email, which has been decrypted, to the protocol proxy 251 (see arrow 311). The protocol proxy 251 provides the incoming email, which is typically in clear text now that it has been decrypted, to the client computer 221 (see arrow 312).

As can be appreciated, incoming emails are encrypted as stored in the mailbox 300 of the user. The encrypted incoming emails are decrypted before they are provided to the client computer 221. The encryption and decryption processes are performed in seamless, transparent fashion to minimize disruption to the user experience of working with the cloud-based email system 210. It is to be noted that a race condition may occur when the client computer 221 receives the incoming email before the cloud access security system 250 replaces the incoming email with its corresponding encrypted email. However, there is a very short window of time when this can occur and only the user's client computer 221 will receive the incoming email during that time.

Figure 6:
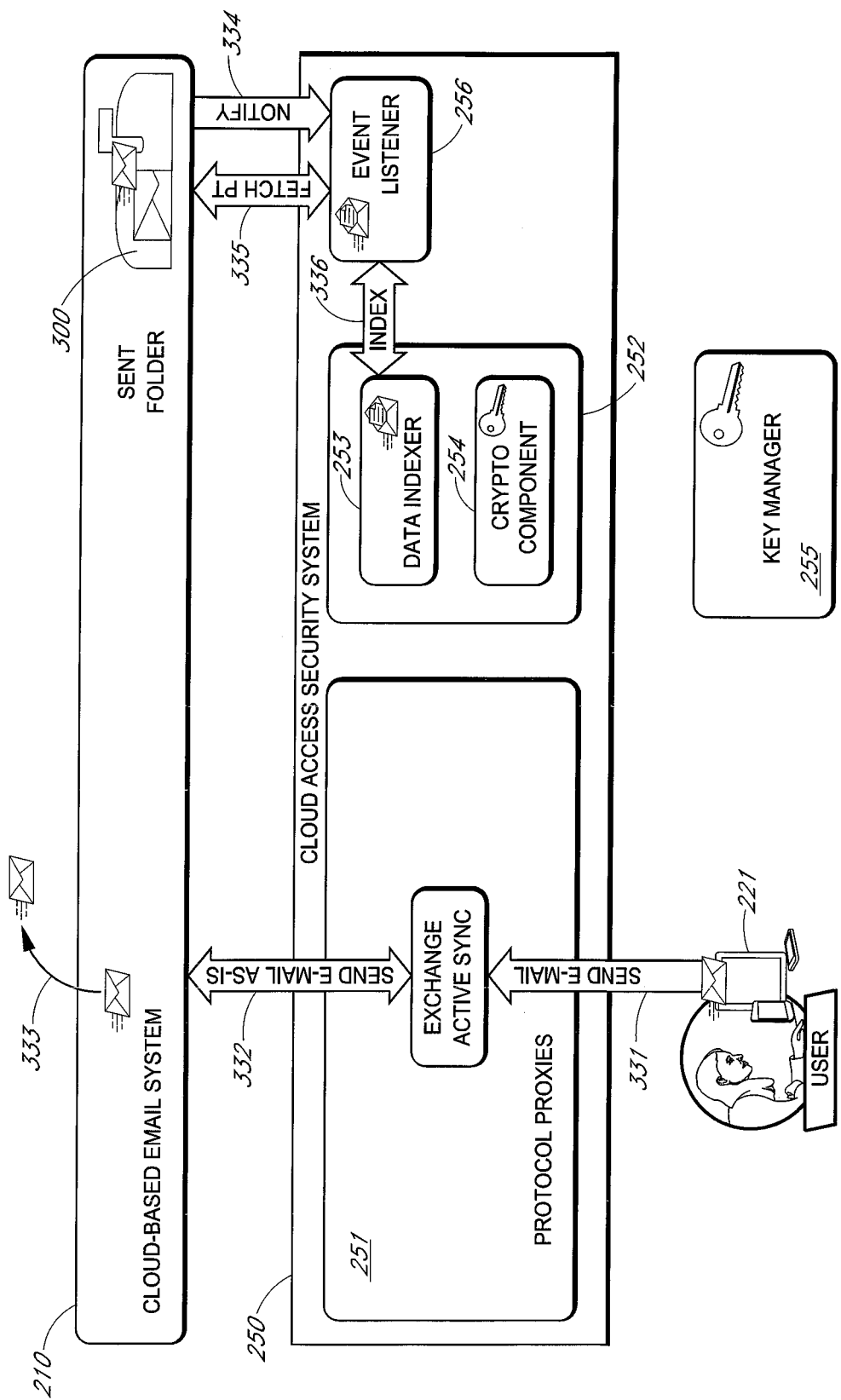
Figure 7:
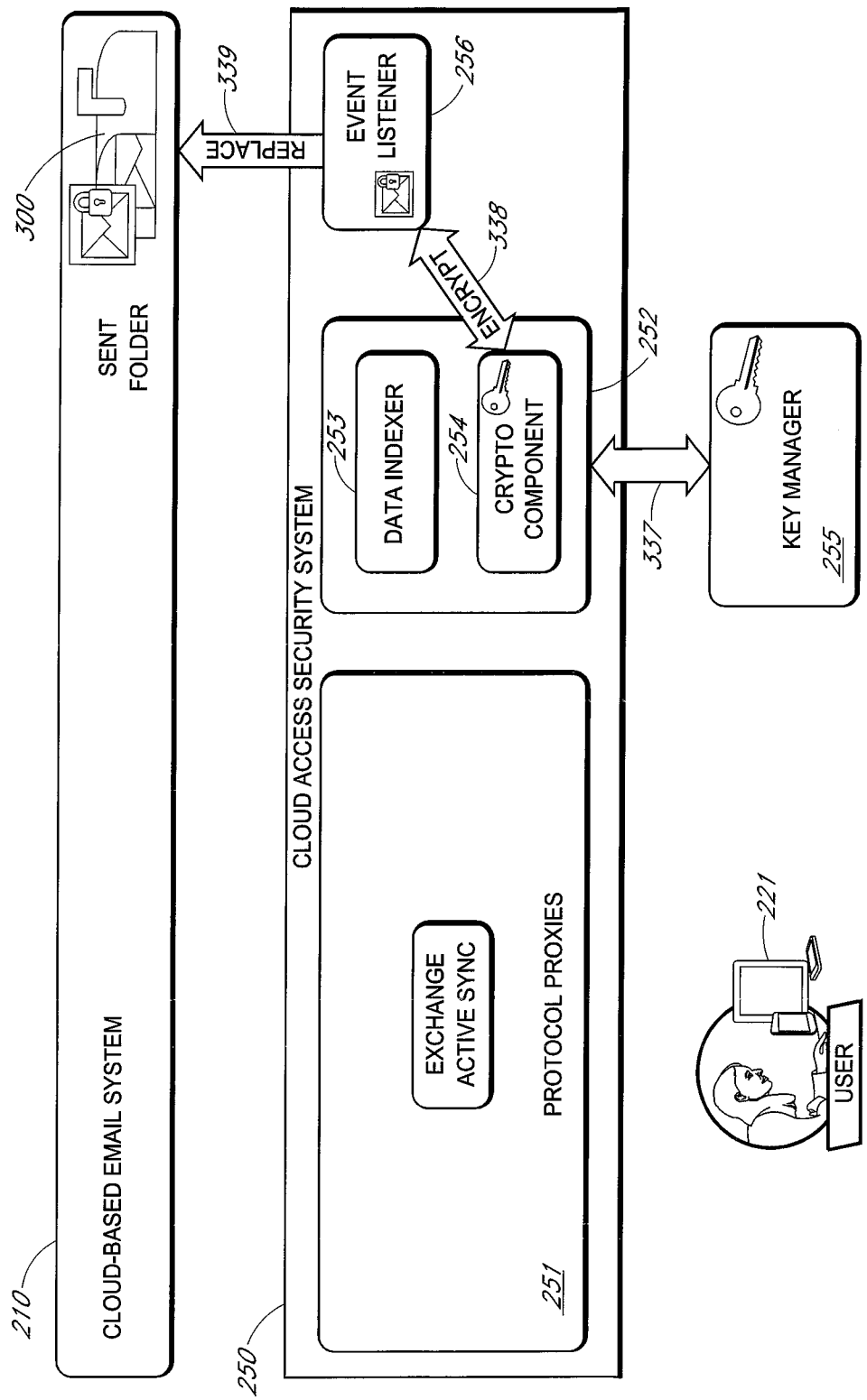

FIGS. 6 and 7 show a flow diagram that schematically illustrates processing of an outgoing email in accordance with an embodiment of the present invention. The flow diagram of FIGS. 6 and 7 may follow the flow diagram of FIGS. 4 and 5 when the user of the client computer 221 sends an outgoing email to another computer over the Internet, for example.

In the example of FIG. 6, the client computer 221 sends out an outgoing email (see arrow 331). The protocol proxy 251 receives the outgoing email. In response to detecting that the email is outgoing, the protocol proxy 251 forwards the outgoing email to the cloud-based email system 210 (see arrow 332). The protocol proxy 251 may pass through the outgoing email without modification. The cloud-based email system 210 receives the outgoing email and forwards the outgoing email to its destination (see arrow 333). The cloud-based email system 210 stores a copy of the outgoing email in the sent folder of the mailbox 300.

Having registered with the cloud-based email system 210 to receive email event notifications, the event listener 256 receives a notification from the cloud-based email system that an outgoing email has been sent by the owner of the mailbox 300, i.e., the user of the client computer 221 (see arrow 334). In response to receiving the notification, the event listener 256 retrieves the outgoing email from the cloud-based email system 210 (see arrow 335). For example, the event listener 256 may request the cloud-based email system 210 to receive a copy of the outgoing email from the sent folder of the mailbox 300. The event listener 256 receives the outgoing email from the cloud-based email system 210 and forwards the outgoing email to the encryption module 252. There, the data indexer 253 receives and indexes the outgoing email (see arrow 336). The data indexer 253 indexes the outgoing email in its unencrypted, typically clear text state to allow for subsequent searching.

Continuing in FIG. 7, the cryptography component 254 requests and receives an encryption key from the key manager 255 (see arrow 337). The event listener 256 receives the outgoing email from the event listener 256, encrypts the outgoing email using the encryption key received from the key manager 255, and provides the resulting encrypted outgoing email to the event listener 256 (see arrow 338). Upon receiving the encrypted outgoing email, the event listener 256 replaces a copy of the outgoing email stored in the mailbox 300 (e.g., in the sent folder of the mailbox 300) with the encrypted outgoing email (see arrow 308). For example, the event listener 256 may delete the outgoing email stored in the mailbox 300 and replace that deleted outgoing email with the corresponding encrypted outgoing email. Accordingly, the mailbox 300 now only has an encrypted version of the outgoing email, thereby protecting the outgoing email as stored in the cloud-based email system 210. The user may obtain and read the outgoing email in its unencrypted form by requesting for the outgoing email, and the cloud access security system receiving the corresponding encrypted outgoing email, decrypting the encrypted outgoing email back to the outgoing email, and providing the outgoing email to the client computer 221 in a similar manner performed for encrypted incoming emails (see FIG. 5, arrows 309-312).

Figure 8:
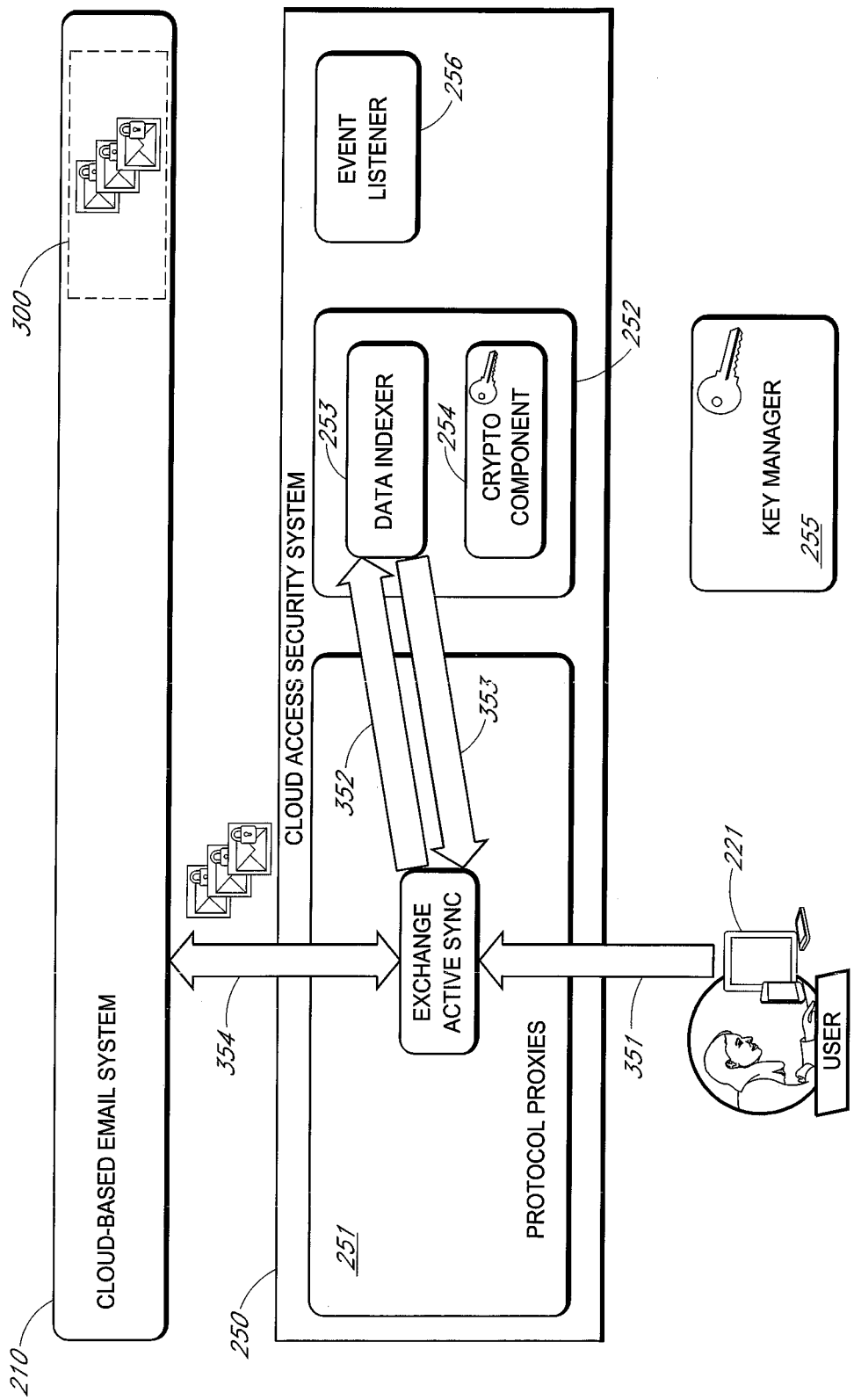
Figure 9:
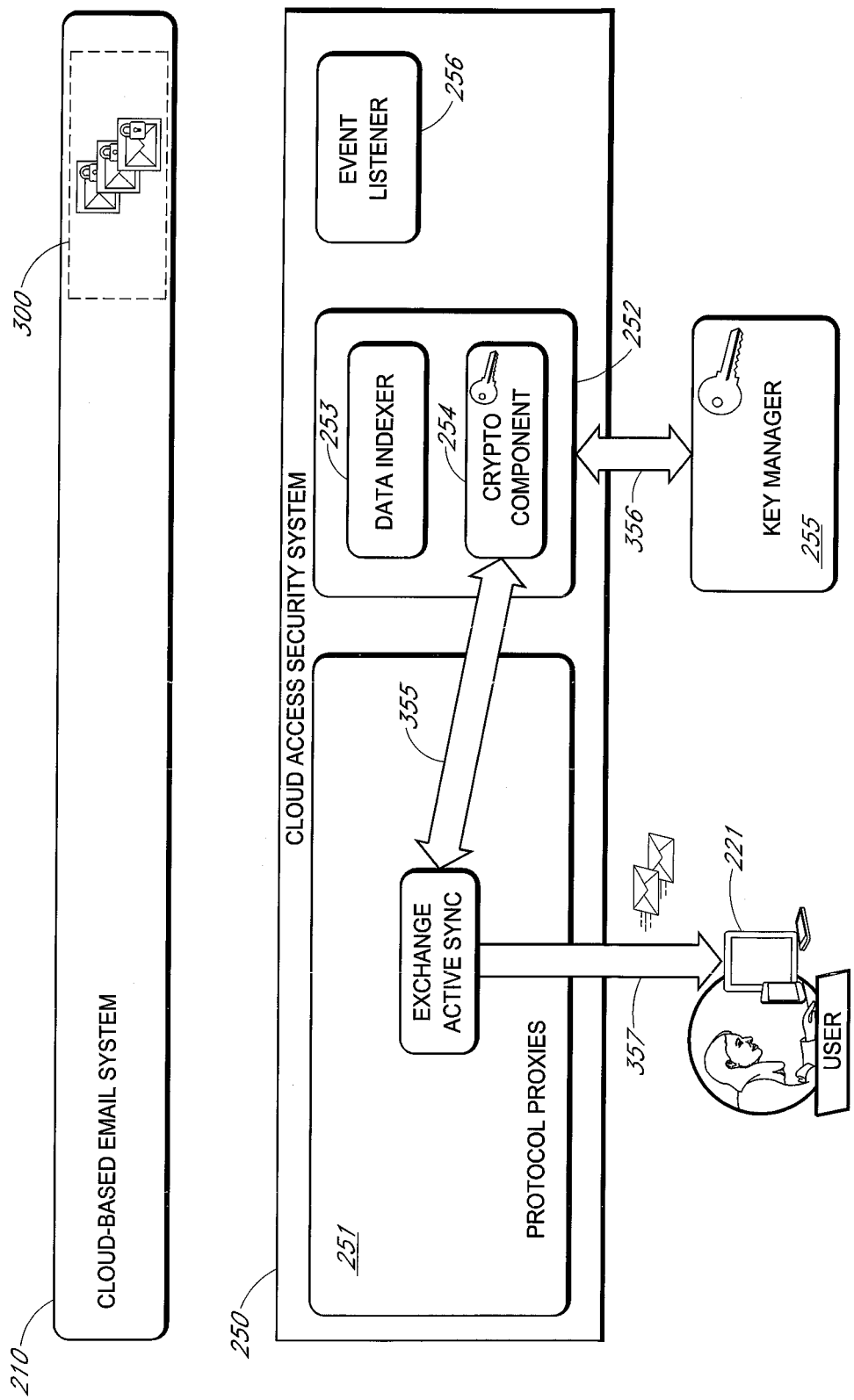

FIGS. 8 and 9 show a flow diagram that schematically illustrates searching a mailbox for one or more emails in accordance with an embodiment of the present invention. The flow diagram of FIGS. 8 and 9 may follow FIGS. 4-7 when the user of the client computer 221 searches the mailbox 300 for particular previously received incoming emails and/or particular previously sent outgoing emails, for example.

In the example of FIG. 8, the user of the client computer 221 is searching for particular emails that were previously received or sent by the user. Accordingly, the user may send an email search query to the cloud-based email system 210 using his client computer 221 (see arrow 351). The email search query may include search criteria specified by the user, such as keywords (e.g., particular texts in the message body or subject field) and/or parameters (e.g., sent by or received from a particular email address). The protocol proxy 251 receives the email search query from the client computer 221, determines from the email search query that the user is searching for emails, and sends a request to the data indexer 253 to identify emails in the mailbox 300 that meet the search criteria (see arrow 352). The data indexer 253 searches its index for encrypted emails in the mailbox 300 that meet the search criteria. The data indexer 253 identifies to the protocol proxy 251 the encrypted emails that meet the search criteria (see arrow 353). The protocol proxy 351 makes a request to the cloud-based email system 210 for the identified encrypted emails, and receives the identified encrypted emails from the cloud-based email system 210 (see arrow 354). Thereafter, as shown in FIG. 9, the protocol proxy 251 forwards the encrypted emails to the cryptography component 254 (see arrow 355), which decrypts the encrypted emails using associated encryption keys provided by the key manager 255 (see arrow 356). The cryptography component 254 provides the resulting, i.e., decrypted, emails to the protocol proxy 251 (see arrow 355). The protocol proxy 251 thereafter provides the emails to the client computer 221 (see arrow 357).

Figure 10:
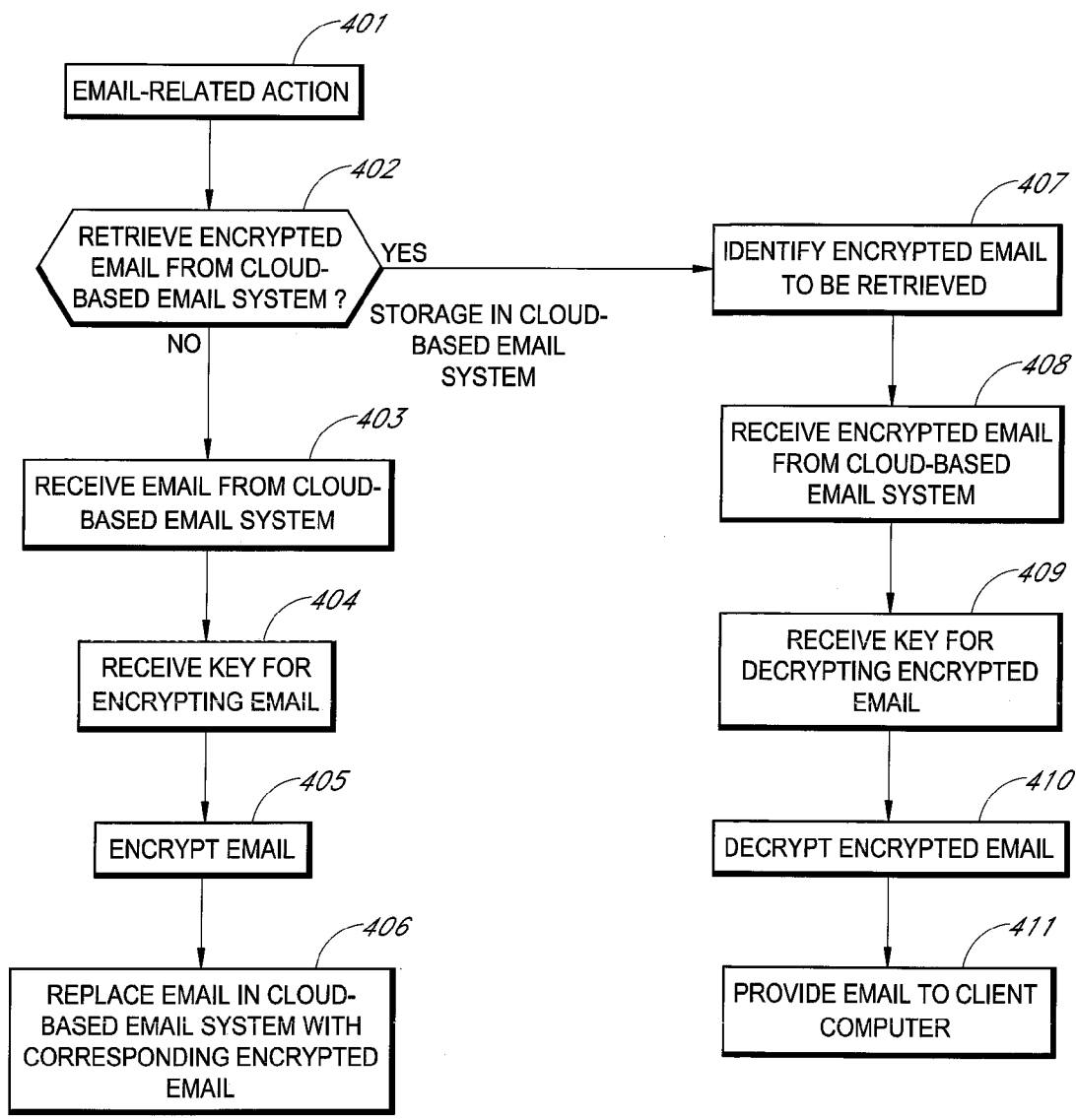
FIG. 10 shows a flow diagram of a method of securing emails stored in a cloud-based email system in accordance with an embodiment of the present invention.

FIG. 10 shows a flow diagram of a method of securing emails stored in a cloud-based email system in accordance with an embodiment of the present invention. The method of FIG. 10 is explained using components of the previously described system for securing cloud-based emails. It can be appreciated, however, that other components may also be employed without detracting from the merits of the present invention.

In the example of FIG. 10, the cloud access security system 250 performs an email-related action to secure emails in the cloud access security system 250 (step 401). The email-related action may involve encryption of an email and storage of the resulting encrypted email in the cloud-based email system 210 or retrieval of an encrypted email from the cloud-based email system 210, for example.

When the email-related action involves encryption of an email and storage of the resulting encrypted email in the cloud-based email system 210, the cloud access security system 250 receives the email from the cloud-based email system 210 (step 402 to step 403). This is the case when the cloud-based email system 210 receives an incoming email for the user or sends an outgoing email for the user, for example. As a particular example, the cloud access security system 250 may request the cloud access security system 250 for an incoming email or an outgoing email in response to receiving an email event notification. The cloud access security system 250 may receive an encryption key from the key manager 255 (step 404), and encrypt the email using the encryption key (step 405). The cloud access security system 250 replaces the email in the cloud-based email system 210 with a corresponding encrypted email (step 406).

When the email-related action involves retrieval of an encrypted email from the cloud-based email system 210, the cloud access security system 250 identifies the encrypted email to be retrieved (step 402 to step 407). For example, the email-related action may involve providing an encrypted incoming email to the client computer 221 of the user. As another example, the email-related action may involve providing the client computer 221 encrypted incoming and/or encrypted outgoing emails that are responsive to a search request. The cloud access security system 250 receives the encrypted email from the cloud-based email system 210 (step 408), receives from the key manager 255 an associated encryption key for decrypting the encrypted email (step 409), decrypts the encrypted email (step 410), and provides the resulting email to the client computer 221 (step 411).

Generally speaking, a cloud access security system may be employed to secure various types of data stored in the cloud, and not just cloud-based emails. For example, a cloud access security system may be employed to secure word processing files, spreadsheet files, and other documents stored in the cloud.

Figure 11:
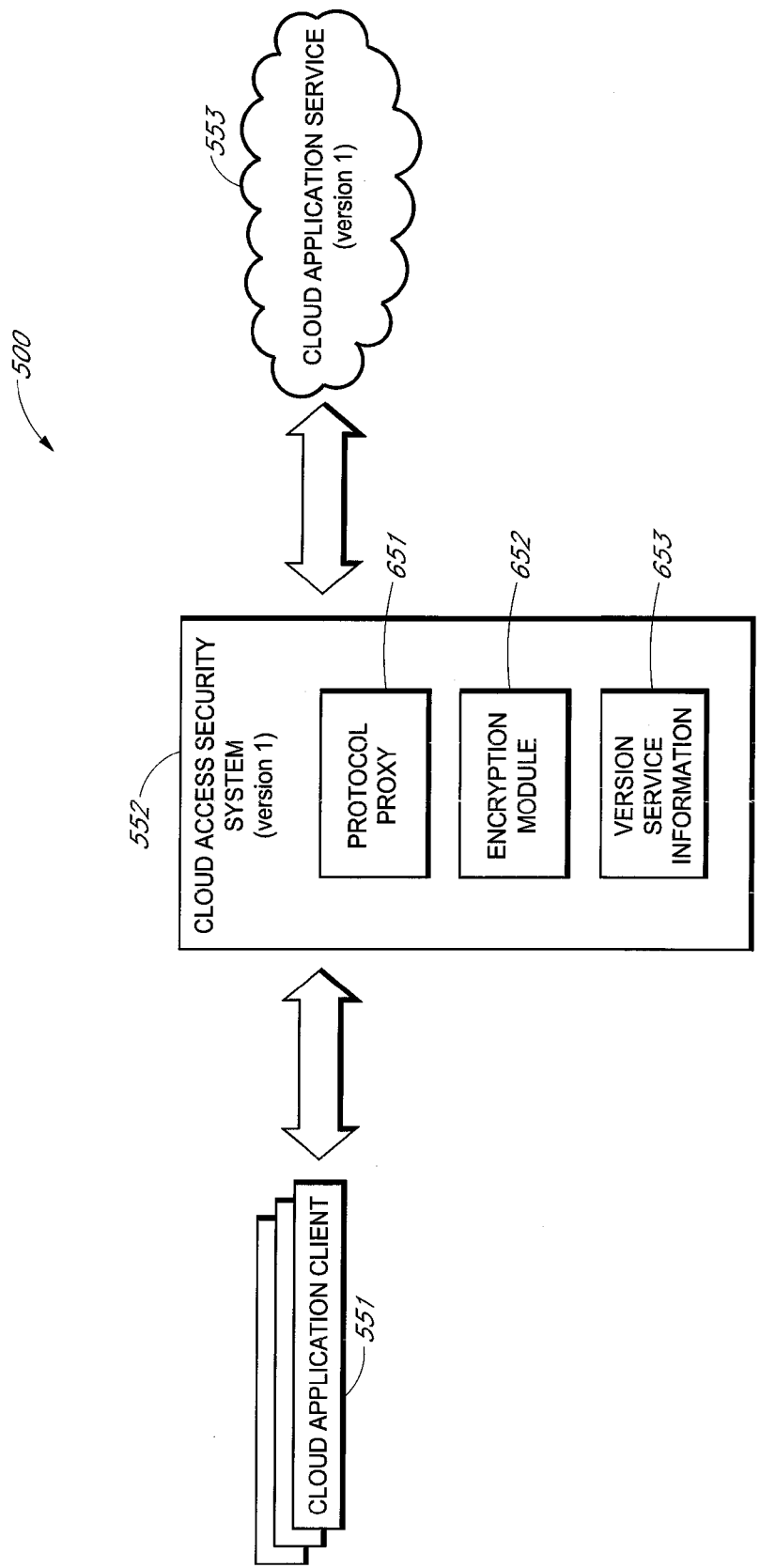
FIG. 11 shows a schematic diagram of a system for securing data stored in the cloud in accordance with an embodiment of the present invention.

FIG. 11 shows a schematic diagram of a system 500 for securing data stored in the cloud in accordance with an embodiment of the present invention. In the example of FIG. 11, the system 500 includes a cloud application client 551, a cloud access security system 552, and a cloud application service 553. The cloud application service 553 may provide a cloud-based email service, a cloud storage service, a social networking service, or other service provided in the cloud. The cloud application client 551 may comprise client-side software for accessing the cloud application service 553. The cloud application client 551 may comprise a web browser, a mobile application (also commonly known as a "mobile app"), or other client-side software. The cloud application client 551 may be running on a client computer, such as a desktop computer, a laptop computer, a smartphone, or a mobile computing device (e.g., a tablet), for example.

The cloud access security system 552 may comprise one or more computers that secure data stored by the cloud application service 553, for example in the cloud computing infrastructure hosting the cloud application service 553. The cloud access security system 552 may include a protocol proxy 651 and an encryption module 652. A protocol proxy 651 may monitor and process data communications between the cloud application client 551 and the cloud application service 553. In one embodiment, all communications between the cloud application client 551 and the cloud application service 553 pass through, and are thereby received by, the protocol proxy 651. The protocol proxy 651 communicates with the cloud application client 551 and the cloud application service 553 in accordance with the communication protocol employed by the cloud application client 551 and the cloud application service 553. The protocol proxy 651 may receive data (e.g., in clear text) from the cloud application client 551, encrypt the data using the encryption module 652, and provide the encrypted data to the cloud application service 553. The protocol proxy 651 may receive encrypted data from the cloud application client 551, decrypt the encrypted data using the encryption module 652, and provide the now unencrypted data to the cloud application client 551. The encryption module 652 may comprise computer-readable program code for encrypting and decrypting data.

In one embodiment, the cloud access security system 552 is a particular implementation of the cloud access security system 250 (see FIG. 2). In that embodiment, the cloud application service 553 may comprise a cloud-based email service of the cloud-based email system 210 and the cloud application client 551 is an email client that runs on the client computer 221. Also in that embodiment, the protocol proxy 651 and the encryption module 652 are particular implementations of, and work in a similar manner, as the protocol proxies 251 and the encryption module 252, respectively, of the cloud access security system 250 (see FIG. 3).

To process data received from the cloud application client 551 and the cloud application service, the cloud access security system 552 may be configured to work with a particular version of the cloud application service. In the example of FIG. 11, the cloud access security system 552 is configured to work with the cloud application service 553, which is "version 1" of the cloud application service. Compatibility with the current version of the cloud application service allows the cloud access security system 552 to understand the communication format of the cloud application service. However, the provider of the cloud application service may implement changes to the cloud application service as part of an update. The changes may alter the communication format of the cloud application service, preventing the cloud access security system 552 from processing data communications to and from the current version of the cloud application service. The update will rarely pose a problem with the functionality of the cloud access security system 552 if announced in advance by the provider of the cloud application service 553, so long as there is ample time between announcement and implementation. Unfortunately, some providers make unannounced changes to their cloud application service, e.g., updating the cloud application service from a previous version to a new version. In that case, the cloud access security system 552 may or may not work with the new version of the cloud application service. For example, the cloud access security system 552 may be unable to decrypt encrypted data when unannounced, unanticipated changes are made the cloud application service.

In one embodiment, the cloud access security system 552 further includes version service information 653. The version service information 653 may be stored in a database or other listing, for example. The version service information 653 may include information on identifiers/locators (e.g., Internet Protocol (IP) address, URL (Uniform Resource Locator), path, etc.) of servers that provide functionality of the cloud application service for a particular version. More particularly, the version service information 653 may identify one or more servers that serves a particular web service call for a particular version of a cloud application service. A server of the cloud application service may comprise one or more computers that run server software for servicing web service calls that implement the functionality of the cloud application service.

The cloud access security system 552 may receive (e.g., by the protocol proxy 651) a web service call from a client computer (e.g., from the cloud application client 551), determine that the web service call is for a service of an unknown version of a cloud application service, consult the version service information 653 to identify a server that services web services calls to a previous version of the cloud application service, and redirect the web service call to that server of the previous version of the cloud application service. The cloud access security system 552 may also receive partial encrypted data and decrypt the partial encrypted data (e.g., by the encryption module 652) without having to wait to receive the rest of the partial encrypted data. The partial encrypted data may comprise partial encrypted email data that may be employed as a message preview, in risk mode when the cloud access security system 552 detects an unknown version of the cloud application service, etc.

Figure 12:
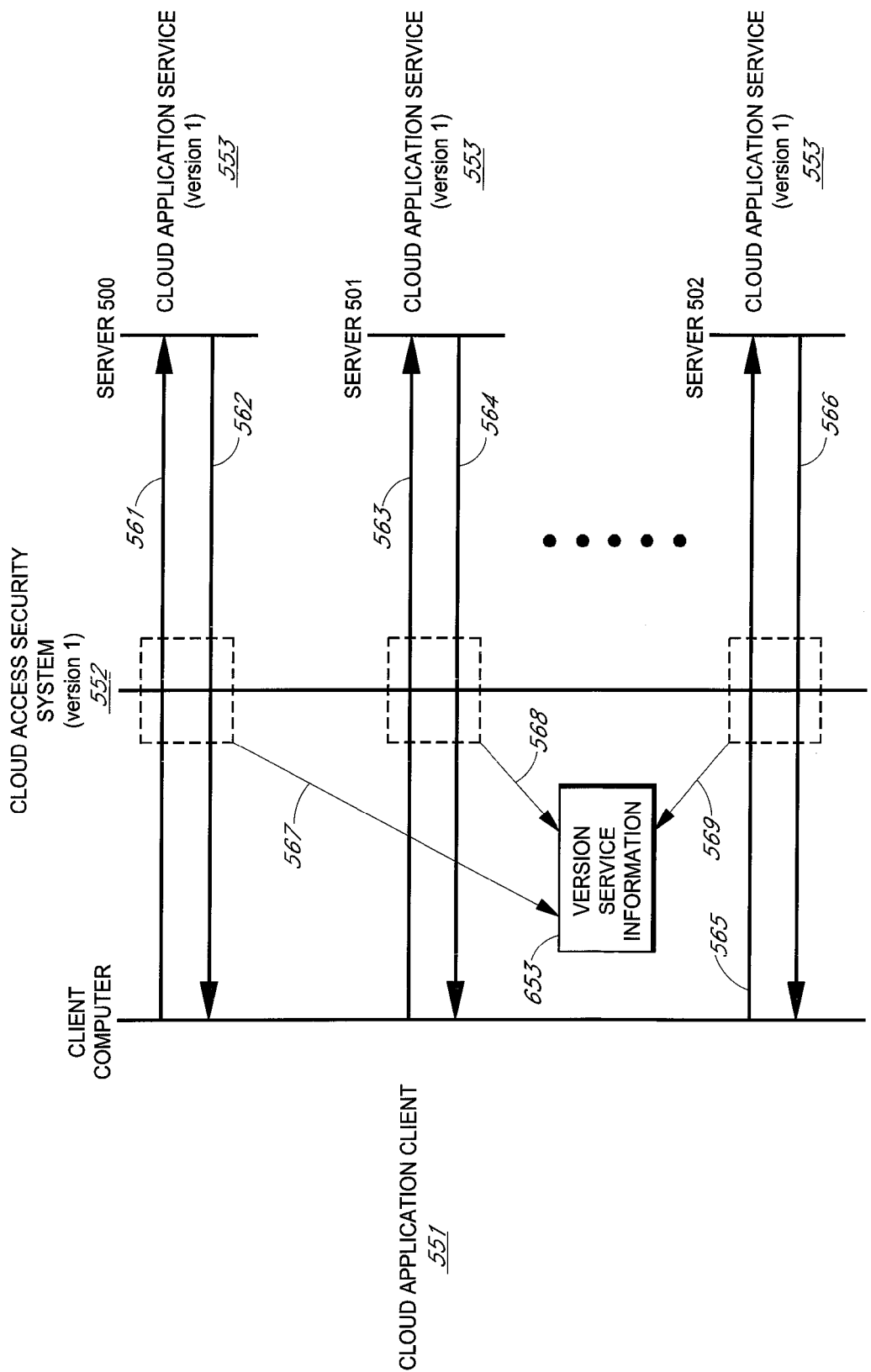
FIG. 12 shows a call diagram that schematically illustrates a computer-implemented method of securing data stored in the cloud in accordance with an embodiment of the present invention.

FIG. 12 shows a call diagram that schematically illustrates a computer-implemented method of securing data stored in the cloud in accordance with an embodiment of the present invention. The call diagram of FIG. 12 is explained with reference to the components of FIG. 11 for illustration purposes only.

In the example of FIG. 12, the cloud application client 551 runs on a client computer and accesses the cloud application service 553. The functionality of the cloud application service 553 may be provided by one or more servers, which are labeled as servers 500, 501, 502, etc. In the example of FIG. 12, the cloud access security system 552 is compatible with the current version of the cloud application service, which in the example of FIG. 12 is the cloud application service 553. The cloud application service 553 is also referred to as "version 1" of the cloud application service. As will be more apparent below, "version 2" (i.e., changed, updated version) of the cloud application service is referred to as the "cloud application service 554."

In the example of FIG. 12, the cloud application client 551 logs onto the cloud application service 553 by way of the server 500 (see arrow 561). After authentication and/or some other logon processing, the server 500 provides a communication to the cloud application client 551 (see arrow 562). The communication from the server 500 to the cloud application client 551 may comprise one or more web executable files, such as a JavaScript file, for example. The web executable file is received and executed in the client computer by the cloud application client 551. Executing the web executable file may result in the cloud application client 551 making web service calls to servers that provide functionality of the cloud application service 553. For example, the cloud application client 551 may make a web service call to the server 501 (see arrow 563) as dictated by computer-readable program code in the web executable file. The web service call may include one or more identifiers of the designated server (which in this example is the server 501) that serves the web service call and other data or information concerning the service request, such as an application programming interface (API) call, an object oriented programming (OOP) method call, etc. The IP address of the server 501 may be obtained from packets or other data of network traffic to the server 501. In response to the web service call, the server 501 provides a communication to the cloud application client 551 (see arrow 564). The communication from the server 501 may include data (e.g., requested data) and/or another web executable file. The cloud application client 551 may also make a web service call to the server 502 (see arrow 565) as per the service provided by the cloud application service 553, and receive a communication from the server 502 (see arrow 566).

The cloud access security system 552 receives and processes communications between the cloud application client 551 and the cloud application service 553. In one embodiment, the cloud access security system 552 stores version-related information detected in communications between the cloud application client 551 and the cloud application service 553 as version service information 653. The protocol proxy 651 may identify the version of the cloud application service 553 during the logon process (see arrow 567). In the example of FIG. 12, the cloud access security system 552 may checksum communication paths (e.g., series of URLs or other network addresses to arrive at a server), data, files (e.g., JavaScript files), etc. during the login process to identify particulars of the cloud application service 553. The cloud access security system 552 may parse the filename or contents of a file (e.g., JavaScript file) to extract version information of the cloud application service 553. The cloud access security system 552 is thus able to identify the version of the cloud application service of 553 during initial communication between the cloud application client 551 and the cloud application service 553.

The cloud access security system 552 may also monitor web service calls made by the cloud application client 551 to servers that serve the web service calls for the version of the cloud application service 553. In particular, when the cloud application client 551 makes a particular web service call to the server 501, the cloud access security system 552 stores the particular web service call and the network identifier, such as the IP address and/or URL, communication path, of the server 501 as version service information for the identified version of the cloud application service 553 (see arrow 568). Similarly, when the cloud application client 551 makes another web service call to the server 502, the cloud access security system 552 stores the other web service call and the network identifier of the server 502 as version service information for the identified version of the cloud application service 553 (see arrow 569). The version service information 653 thus includes a mapping of servers that service particular web service calls for a version of the cloud application service 553. The version service information 653 compiled by the cloud access security system 552 may also include a mapping of OOP methods and the servers called by the OOP methods for the particular version of the cloud application service 553.

Figure 13:
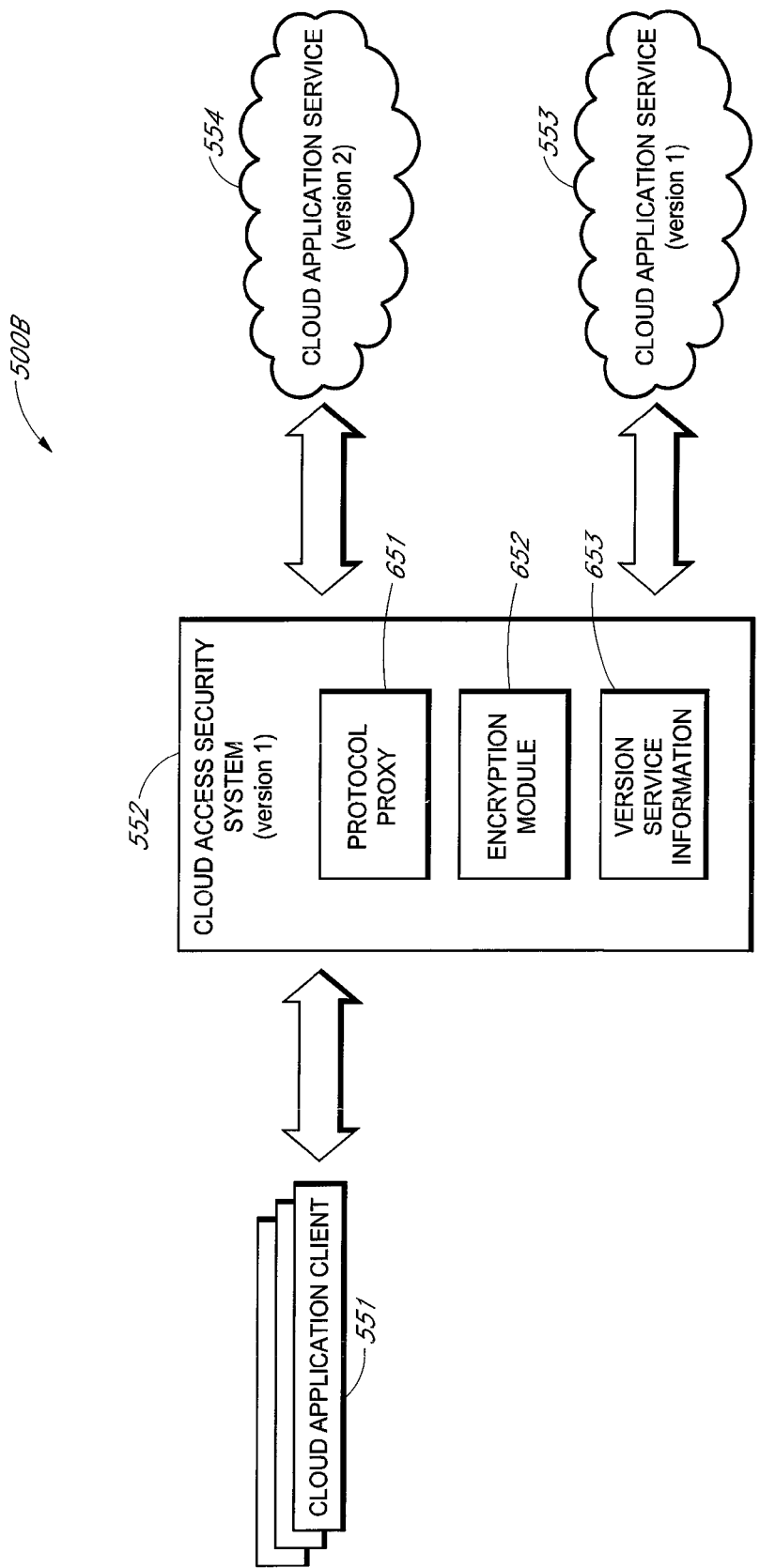
FIG. 13 shows a schematic diagram of a system for securing data stored in the cloud in accordance with an embodiment of the present invention.

FIG. 13 shows a schematic diagram of a system 500B for securing data stored in the cloud in accordance with an embodiment of the present invention. The system 500B is the same as the system 500 of FIG. 11, except that the cloud application service has been updated to a "version 2," which is referred to as the cloud application service 554. As is typical in cloud application service update implementations, the provider of the cloud application service leaves the previous version of the cloud application service available while phasing-in the new version of the cloud application service. This allows previous, outdated versions of the cloud application client to remain operable. More particularly, in the example of FIG. 13, the cloud application service 553 remains accessible even after the cloud application service 554 is released. The other components shown in FIG. 13 are as previously discussed.

Figure 14:
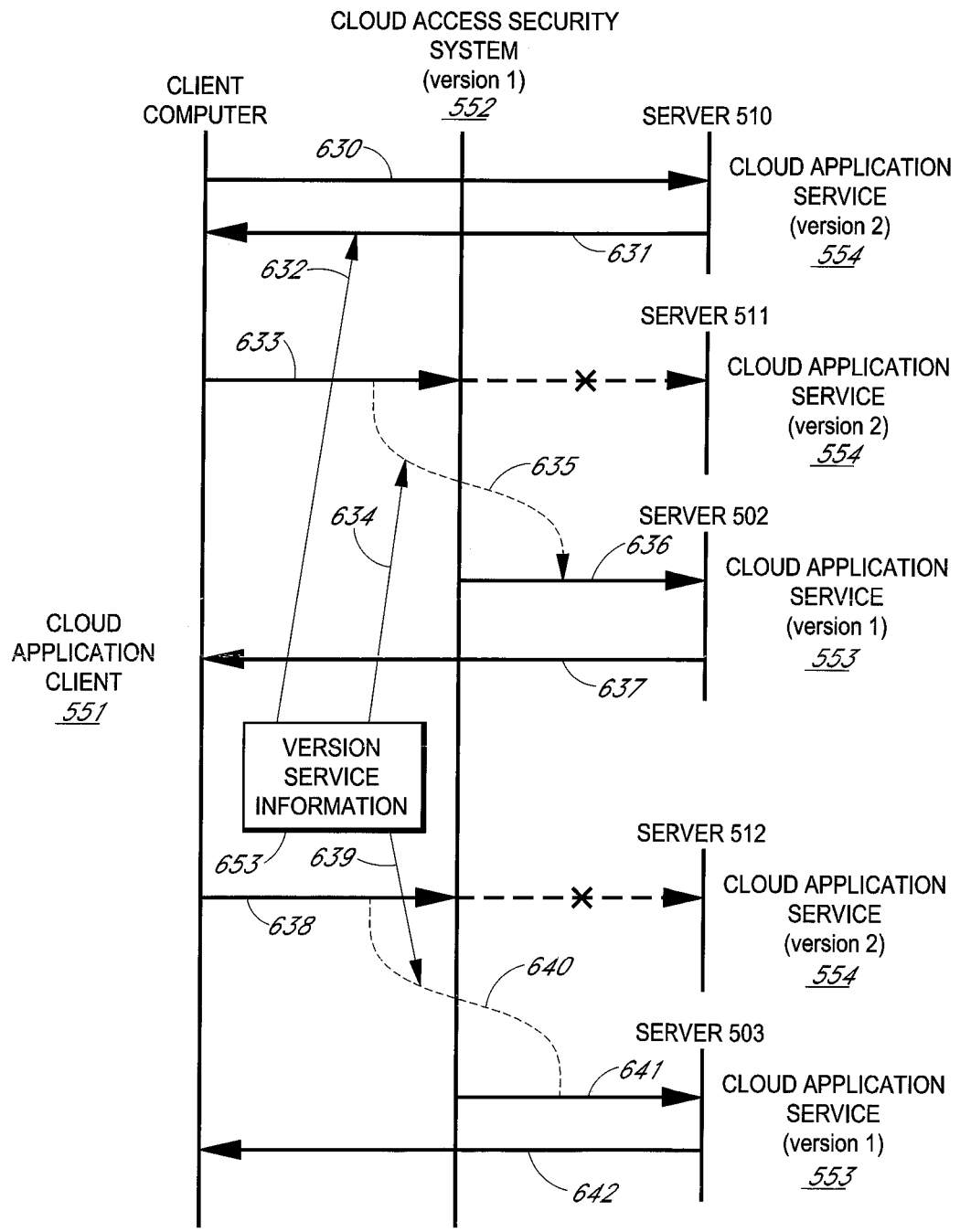
FIG. 14 shows a call diagram of a computer-implemented method of adapting a cloud access security system to unannounced changes to a cloud application service in accordance with an embodiment of the present invention.

FIG. 14 shows a call diagram of a computer-implemented method of adapting a cloud access security system to unannounced changes to a cloud application service in accordance with an embodiment of the present invention. The call diagram of FIG. 14 is explained with reference to the components of FIG. 13 for illustration purposes only.

In the example of FIG. 14, the cloud application client 551 is running on a client computer and accesses the cloud application service, which in this example has been updated to the cloud application service 554. The functionality of the cloud application service 554 is provided by one or more servers, which are labeled as servers 510, 511, 512, etc. The functionality of the cloud application service 553 are provided by one or more servers, which are labeled as servers 501, 502, etc. as before.

In the example of FIG. 14, the cloud access security system 552 is compatible with the previous version (i.e., the cloud application service 553) of the cloud application service. Because the update to the cloud application service is unannounced, the cloud access security system 552 has not been adapted to work with the current version of the cloud application service, which is the cloud application service 554 in this example. Therefore, the cloud access security system 552 may not recognize the version of the cloud application service 554. Worse, the cloud access security system 552 may not be able to decrypt encrypted emails or other encrypted data that have been previously encrypted by the cloud access security system 552 for storage in the cloud.

To log onto the cloud application service, the cloud application client 551 points to the URL assigned to the cloud application service without necessarily knowing the version of the cloud application service. The provider simply provides the latest version of the cloud application service on the assigned URL. In the example of FIG. 14, the assigned URL now references a server of the cloud application service 554, instead of the cloud application service 553. The cloud access security system 552 receives the communication from the cloud application client 551, detects that the cloud application client 551 is attempting to log onto the cloud application service, and forwards the communication to the cloud application service in accordance with the URL assigned to the cloud application service, which is now the cloud application service 554 (see arrow 630).

After authentication and/or some other logon processing, the server 510 provides a communication to the cloud application client 551 (see arrow 631). The communication from the server 510 to the cloud application client 551 may comprise one or more web executable files, such as a JavaScript file, for example. Based on a file received from the cloud application service 554 or other data in the communication indicative of the version of the cloud application service as previously detected and stored as version service information 653, the cloud access security system 552 detects that the cloud application service has been updated from the cloud application service 553 to some other current and unknown version, which in this example is the cloud application service 554 (see arrow 632). In response, the cloud access security system 552 may send an alert or other message to a system administrator or other personnel to start analyzing the new version of the cloud application service so that the cloud access security system 552 may be updated accordingly. The cloud access security system 552 may also start to expect to receive web service calls to new versions of services that are served by new, unknown servers.

An updated web executable file for the new version of the cloud application service, i.e., the cloud application service 554, is received and executed in the client computer by the cloud application client 551. Executing the updated web executable file results in the cloud application client 551 making web service calls to servers that provide functionality of the cloud application service 554. For example, the cloud application client 551 may make a web service call to the server 511 (see arrow 633). The cloud access security system 552 detects that the web service call is for a new, unknown version of the cloud application service and may not be compatible with the cloud access security system 552. In response, the cloud access security system 552 looks up the last known good (i.e., compatible and working) version of the web service call to a last known good server of the previous version of the cloud application service. From the version service information 653, the cloud access security system 552 identifies the server 502 as the last known good server that services the web service call in the previous version of the cloud application service (see arrow 634). Accordingly, the cloud access security system 552 redirects the web service call to the server 502. The server 502, instead of the intended server 511, receives (see arrow 636) and services (see arrow 637) the web service call as in the previous version of the cloud application service, which is the cloud application service 553.

Similarly, when the cloud application client 551 makes a web service call that is directed to the server 512, which services the web service call for the cloud application service 554 (see arrow 638), the cloud access security system 552 detects that the web service call is to an unknown version of the cloud application service and is being made to the unknown server 512. In response, the cloud access security system 552 redirects the web service call to the server 503, which is the last known good server that services the web service call in the previous version of the cloud application service, in accordance with the version service information 653 (see arrow 639). The server 503, instead of the intended server 512, receives (see arrow 641) and services (see arrow 642) the web service call as per the cloud application service 553. Advantageously, the above-described procedure allows the cloud access security system 552 to continue processing communications between the cloud application client 551 and the cloud application service, although possibly with some loss in functionality, until such time that the cloud access security system 552 is updated to recognize and be fully compatible with the cloud application service 554.

Figure 15:
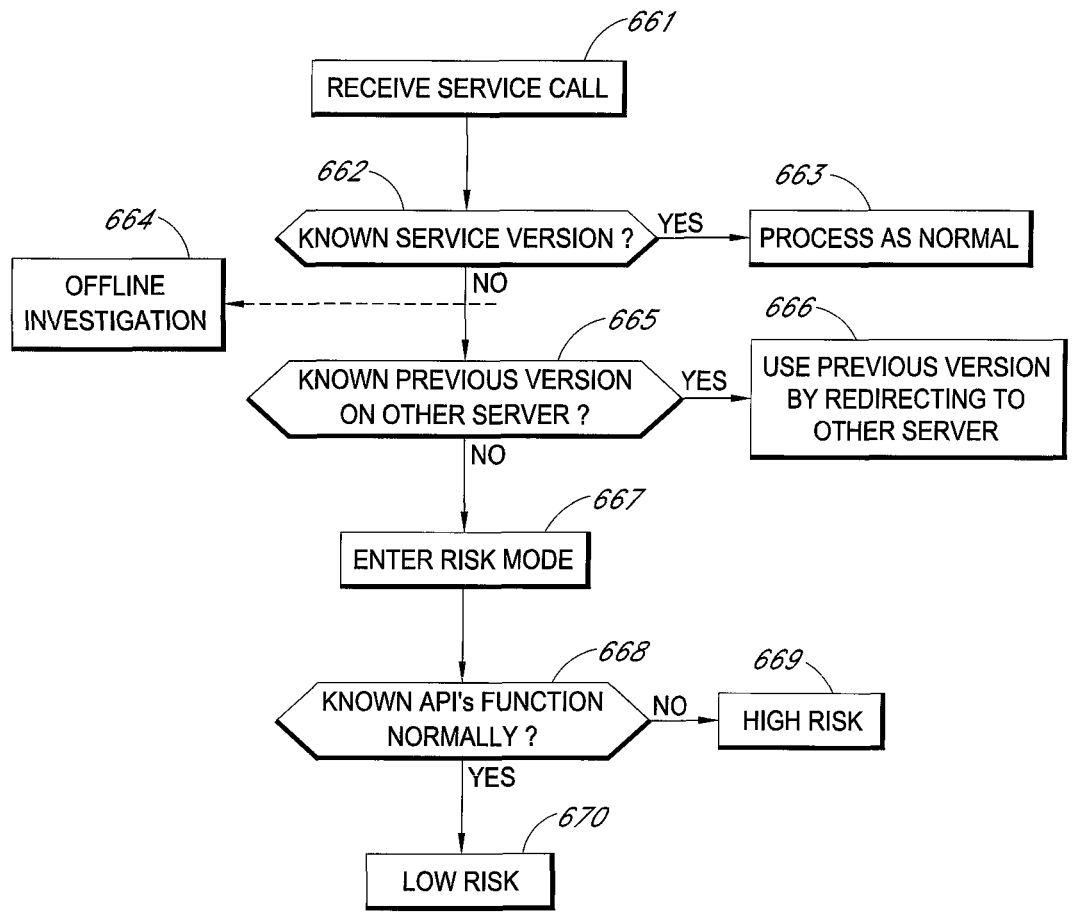
FIG. 15 shows a flow diagram of a computer-implemented method of adapting a cloud access security system to unannounced changes to a cloud application service in accordance with an embodiment of the present invention.

FIG. 15 shows a flow diagram of a computer-implemented method of adapting a cloud access security system to unannounced changes to a cloud application service in accordance with an embodiment of the present invention. The flow diagram of FIG. 15 is explained with reference to the components of FIG. 13 for illustration purposes only.

In the example of FIG. 15, the cloud access security system 552 receives a web service call sent by the cloud application client 551 to a server of a cloud application service (step 661). The web service call may be a request to receive an email, for example. The cloud access security system 552 processes the web service call as normal when the web service call is for a service of a version of the cloud application service that is known to the cloud access security system 552 (step 662 to step 663). This is the case when the cloud access security system 552 is compatible with the cloud application service 553 and the web service call is for a service of the cloud application service 553, as indicated by version information in the web service call.

When the cloud access security system 552 detects that the web service call is for a service of an unknown version of the cloud application service, the cloud access security system 552 consults the version service information 653 to determine if there is a known good server of the previous version of the cloud application service that may service the web service call (step 662 to step 665). This is the case when the cloud access security system is compatible with the cloud application service 553 but not with the cloud application service 554 and the web service call is for a service of the cloud application service 554.

The cloud access security system 552 may also alert the system administrator of the cloud access security system 552 such that an off-line investigation of the unknown version of the cloud application service may be initiated (step 662 to step 664).

When the version service information 653 indicates that a known good server of the previous version of the cloud application service may service the web service call, the cloud access security system 552 redirects the web service call to the known good server of the previous version of the cloud application service (step 665 to step 666). For example, the cloud access security system 552 may forward the web service call to a server that provides the service for the cloud application service 553, instead of a server that provides the service for the cloud application service 554. This way, the cloud access security system 552 is assured that it will be able to handle data returned by the server in response to the web service call.

When the version service information 653 has no entry as to a known good server that may be able to service the web service call, the cloud access security system 502 may enter a so-called "risk mode" (step 665 to step 667). In risk mode, the cloud access security system 552 may forward the web service call to the server of the new version of the cloud application service. Because the cloud access security system 552 has not been tested for compatibility with the new version of the cloud application service, there is a likelihood that the cloud access security system 552 may not be able to properly process data received from the server.

In risk mode, the cloud access security system 552 may detect if the web service call involves known API's (application programming interface), OOP methods, function, or other instruction that are known to be compatible with cloud access security system 552, e.g., as indicated in the version service information 653. If so, the cloud access security system 552 may alert the user of the possible incompatibility with the cloud application service but the risk of incorrect processing is low (step 668 to step 670). Otherwise, the cloud access security system 552 may alert the user of the possible incompatibility with the cloud application service and the risk of incorrect processing is high (step 668 to 669). In either case, the user is alerted of the incompatibility and may decide to wait until such time that the cloud access security system 552 is updated or tested to work as compatible with the new version of the cloud application service.

As explained, data may be encrypted by the cloud access security system 552 prior to storage in the cloud. In one embodiment, the cloud access security system 552 performs the encryption such that partial decryption may be performed in cases where there might be incompatibility with the cloud application service 553 as well as to support message previews or other truncated displaying of clear text portions of the encrypted data. For example, in the case of the Microsoft Office 365™ email server, the subject field of the email is limited to 256 characters in length, some of the lines of the message body are used as "preview" of the e-mail, and the email is sent in parts when the email is very large. Partial decryption advantageously allows for decryption of encrypted email in those cases where the entirety of the encrypted email is not received by the cloud access security system 552.

FIG. 16 shows a schematic diagram of data encrypted by the cloud access security system 552 (e.g., by the encryption module 652) in accordance with an embodiment of the present invention. In the example of FIG. 16, the encrypted data comprises email data represented in base 64 format. Accordingly, the encrypted email data comprises encrypted base 64 characters. In one embodiment, the encrypted data is placed between a start marker ("start") and an end marker ("end"). As their name implies, a start marker indicates the beginning of the encrypted data and an end marker indicates the end of the encrypted data. The start and end markers may comprise one or more characters that are not included the character set that represents the data, or in the base 64 character set in the case where the data comprises email data. In one embodiment, the start marker is "$#$$" and the end marker is a single character (e.g., space or "<") that is not included in the set of characters employed to represent the data. FIG. 17 shows example encrypted data in the JSON (JavaScript object notation) format (top of FIG. 17; delimited by quotation marks) and the HTML (hypertext markup language) format (bottom of FIG. 17; delimited by tags). FIG. 18 shows a series of encrypted data for the subject field, message preview portion, and message body of an email.

Figure 19:
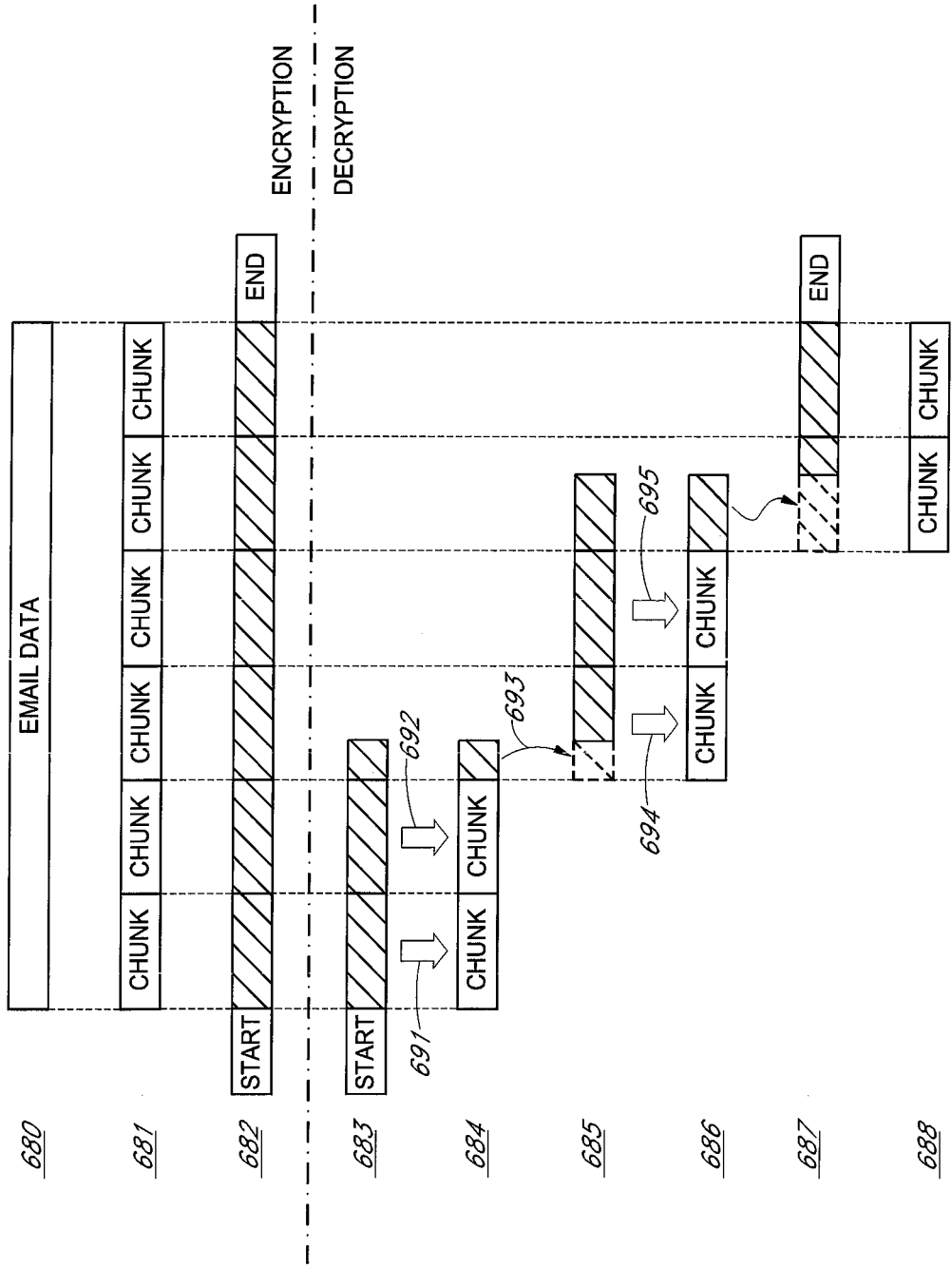
FIG. 19 schematically illustrates a computer-implemented method of encrypting and decrypting data in accordance with an embodiment of the present invention.

FIG. 19 schematically illustrates a computer-implemented method of encrypting and decrypting data in accordance with an embodiment of the present invention. Although the method may be employed to secure data in general, the method is especially advantageous when employed with cloud-based emails in that partial decryption may be performed to accommodate email data for showing message preview, subject, partial message body content in the event of an unannounced changed to the cloud application service, etc. The method of FIG. 19 is now explained with reference to the components shown in FIG. 11 and in the context of the cloud-based emails for illustration purposes only.

FIG. 19 shows the method in sequential stages, which are labeled as stages 680-688. Stages 680-682 illustrate encryption of email data (or other data) for storage in the cloud application service 553, which in this example comprises a cloud-based email system. Stages 683-688 illustrate decryption of the encrypted email data for delivery to the cloud application client 551 in clear text.

The email data to be encrypted (FIG. 19, stage 680) may comprise a subject, message preview, or message body of the email (e.g., see FIG. 18). For example, the email data may be part of an incoming email for the cloud application client 551. The protocol proxy 651 receives the email data in clear text and provides the email data to the encryption module 652. The encryption module 652 initiates encryption by dividing the email data into a plurality chunks (FIG. 19, stage 681), with each chunk having a predetermined size, such as a predetermined number of characters, bits, bytes, etc. All of the chunks may have the same size except for the last chunk. The encryption module 652 encrypts each chunk separately (FIG. 19, stage 682). This allows the encryption module 652 to subsequently decrypt each encrypted chunk independent of other encrypted chunks of the same email data in cases where the other encrypted chunks are not available. In the example of FIG. 19, the encrypted chunks are shown with slashes. The encryption module 652 adds a prefix and a stop indicator to the encrypted chunks, which in the example of FIG. 19 are a start marker and an end marker, respectively (FIG. 19, stage 682). The encrypted email data, which now include start and end markers, may be stored in the cloud computing infrastructure of the cloud application service 553.

Figure 20:
FIG. 20 schematically shows partial email data in the JSON format and HTML format in accordance with an embodiment of the present invention.
Figure 20:

Subsequently, the cloud access security system 552 receives part of the encrypted email data from the cloud application service 553 (FIG. 19, stage 683). The cloud access security system 552 may not receive all of the encrypted email data for a variety of reasons including incompatibility with the cloud application service 553 (e.g., unannounced changes to the cloud application service 553), the partial encrypted email data is for a message preview, the partial encrypted email data is for a subject field, etc. Because the encrypted email data is incomplete, some of the encrypted chunks and the end marker of the email data may be missing (FIG. 19, stage 683). FIG. 20 schematically shows partial, i.e. incomplete, email data in the JSON format (FIG. 20, top) and HTML format (FIG. 20, bottom).

Continuing with FIG. 19, the protocol proxy 651 sends the partial encrypted email data to the encryption module 652 for decryption (FIG. 19, stage 683). The encryption module 652 looks for the start marker to detect the beginning of the partial encrypted email data and proceeds to decrypt each complete encrypted chunk following the start marker (FIG. 19, arrows 691 and 692). The encryption module does not decrypt an incomplete encrypted chunk (e.g., encrypted chunk with missing characters, does not fill the chunk boundary). The encryption module 652 may return the decrypted chunks and the incomplete encrypted chunk back to the protocol proxy 651. The protocol proxy 651 may forward the decrypted chunks, which are now in clear text, to the cloud application client 551 for displaying to the user as a preview of the message body, subject, or part of the message body etc., without waiting to receive and decrypt the rest of the encrypted email data.

The encryption module 652 may return the incomplete encrypted chunk to the protocol proxy 651 with an indicator or instruction to attach or concatenate the incomplete encrypted chunk to the remaining portions of the incomplete encrypted chunk. For example, the protocol proxy 651 may combine (FIG. 19, arrow 693) a first portion of the encrypted chunk received in a first transmission of the encrypted chunk (FIG. 19, stage 683) with a second portion of the encrypted chunk received in a second transmission of the encrypted chunk (FIG. 19, stage 685). In that example, the encrypted chunk consists of only the first portion and the second portion, so receiving the second portion completes the encrypted chunk. The protocol proxy 651 provides the now complete encrypted chunk to the encryption module 652 for decryption (FIG. 19, arrow 694) along with other complete encrypted chunks (FIG. 19, arrow 695; stage 686). The encryption module 652 returns the decrypted chunks and any incomplete encrypted chunk to the protocol proxy 651 as before. The just described decryption process for decrypting the encrypted email data may be repeated until receipt of the end marker, which indicates that the entirety of the encrypted email data has been received (FIG. 19, stages 687 and 688). The decryption process may also be ended without receiving the end marker when the protocol proxy 651 determines that the cloud application service 553 will no longer provide additional encrypted chunks, such as in the case of receiving email data for message preview or subject field, for example.

Figure 21:
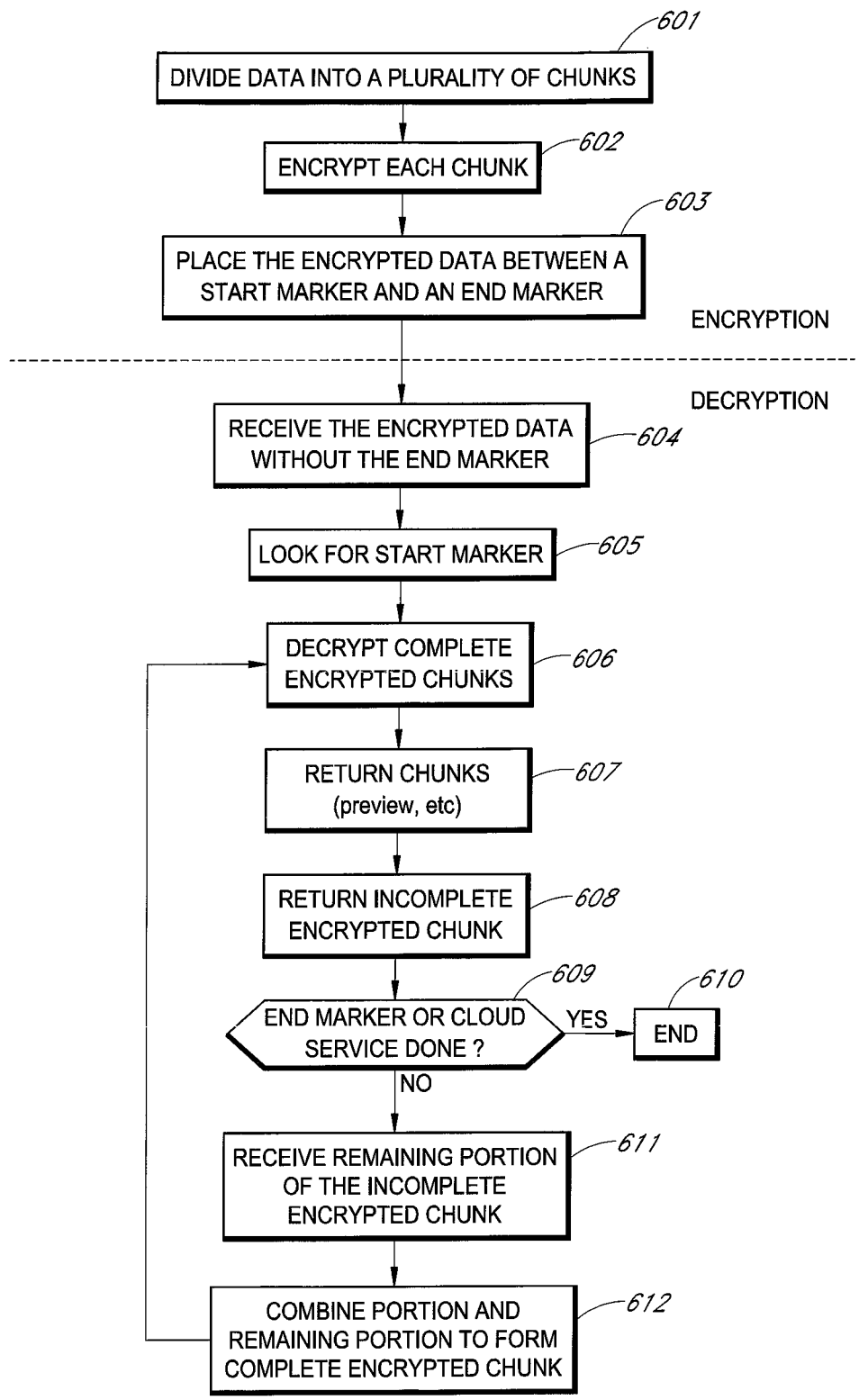
FIG. 21 shows a flow diagram of a computer-implemented method of encrypting and decrypting data in accordance with an embodiment of the present invention.

FIG. 21 shows a flow diagram of a computer-implemented method of encrypting and decrypting data in accordance with an embodiment of the present invention. Although the method may be employed to secure data in general, the method is especially advantageous when employed with cloud-based emails. The method of FIG. 21 is now explained with reference to the components shown in FIG. 11 and in the context of the cloud-based emails for illustration purposes only.

In the example of FIG. 21, the steps 601-603 are steps for encrypting email data to be stored in the cloud, and the steps 604-612 are steps for decrypting encrypted email data to be provided to the cloud application client 551 for viewing by the user.

In the example of FIG. 21, the protocol proxy 651 receives the email data in clear text, i.e., unencrypted, and provides the email data to the encryption module 652. The encryption module 652 divides the email data into a plurality of chunks (step 601), encrypts each chunk of the plurality of chunks (step 602), and places the encrypted chunks between a start marker and an end marker to generate a formatted encrypted email data (step 603). The encryption module 652 returns the formatted encrypted email data (i.e., with the start and end markers) to the protocol proxy 651, which forwards the formatted encrypted email data to the cloud application service 553. The cloud application service 553 stores the formatted encrypted email data in the cloud.

Subsequently, the protocol proxy 651 receives a portion, i.e., not the entirety, of the formatted encrypted email data over the Internet (step 604). More specifically, the formatted encrypted email data does not have an end marker. Regardless, the protocol proxy 651 provides the portion of the formatted encrypted email data to the encryption module 652 for partial decryption. The encryption module 652 begins the decryption process by looking for the start marker (step 605). The encryption module 652 identifies and decrypts complete encrypted chunks of the encrypted email data that follow the start marker (step 606). The encryption module 652 provides the decrypted encrypted chunks to the protocol proxy 651, which provides them to the cloud application client 551 for viewing by the user as a message preview, subject field, or some other reason. For example, the partial formatted encrypted email data may be due to incompatibility of the cloud access security system 552 because of unannounced changes to the cloud application service. In that case, the cloud access security system 552 is able to decrypt portions of the formatted encrypted email data even in risk mode.

In one embodiment, the encryption module 652 does not decrypt incomplete encrypted chunks. Instead, the encryption module 652 returns an incomplete encrypted chunk to the protocol proxy 651 (step 608). The protocol proxy 651 may combine the returned incomplete encrypted chunk with the rest of the incomplete encrypted chunk if subsequently received (e.g., see step 612). The decryption of the encrypted email data is ended when the end marker of the encrypted email data is received or when the protocol proxy 651 determines that the cloud application service 553 will not send additional portions of encrypted email data (step 609 to 610), as is the case when the encrypted email data is for a message preview or a subject field, for example. Otherwise, the protocol proxy 651 receives additional portions of the encrypted email data, including remaining portions of the incomplete encrypted chunk that was not decrypted (step 611). The protocol proxy 651 combines the portions of the incomplete encrypted chunk to complete the encrypted chunk for decryption by the encryption module 652 (step 612). The decryption process is then repeated.

Systems and methods for securing data stored in the cloud have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
receiving a web service call from a client computer, the web service call being for a current version of a cloud application service and is received in a cloud access security system, the cloud access security system being adapted to work with a previous version of the cloud application service and not with the current version of the cloud application service, wherein the cloud access security system processes the response by decrypting an encrypted data included in the first response;

in response to detecting that the web service call is for the current version of the cloud application service and not for the previous version of the cloud application service, identifying a first server that services web service calls to the previous version of the cloud application service; and redirecting the web service call to the first server instead of a second server that services web service calls to the current version of the cloud application service, the cloud access security system receiving a first response from the first server;

the cloud access security system processing the first response before forwarding the first response to the client computer.

2. The computer-implemented method of claim 1, further comprising:

maintaining version service information that identifies servers that service web services calls to the previous version of the cloud application service.

3. The computer-implemented method of claim 2, further comprising:

identifying the first server from the version service information.

4. A system comprising:

a cloud access security system that receives a web service call from a client computer, detects that the web service call is for an unknown version of a cloud application service, identifies a first server that services web service calls to a previous version of the cloud application service, and redirects the web service call to the first server instead of to a second server that services web service calls to the unknown version of the cloud application service, wherein the cloud access security system receives a first response from the first server, decrypts data included in the first response, and provides the decrypted data to the client computer.

5. The system of claim 4, further comprising:

the client computer that hosts a cloud application client that communicates with the cloud application service and sends a web service call to the cloud application service.

6. The system of claim 4, wherein the cloud application service provides a cloud-based email service.

7. The system of claim 4, wherein the cloud access security system compiles a version service information indicating the first server.

8. The system of claim 7, wherein the cloud access security system consults the version service information to identify the first server in response to detecting that the web service call is for the unknown version of the cloud application service.

9. The system of claim 4, wherein the web service call is a request for an incoming email to the client computer.

* * * * *